(12) United States Patent
Nemazie et al.

(10) Patent No.: US 7,783,802 B1
(45) Date of Patent: *Aug. 24, 2010

(54) SERIAL ADVANCED TECHNOLOGY ATTACHMENT (SATA) SWITCH THAT TOGGLES WITH POWER CONTROL TO HARD DISK DRIVE WHILE AVOLDING INTERRUPTION TO SYSTEM

(75) Inventors: Siamack Nemazie, Los Altos, CA (US); Shiang-Jyh Chang, San Jose, CA (US); Young-Ta Wu, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 1269 days.

This patent is subject to a terminal disclaimer.

(21) Appl. No.: 11/186,371

(22) Filed: Jul. 21, 2005

Related U.S. Application Data

(63) Continuation-in-part of application No. 10/986,732, filed on Nov. 12, 2004, now Pat. No. 7,526,587, which is a continuation-in-part of application No. 10/755, 521, filed on Feb. 9, 2004, now Pat. No. 7,523,236, and a continuation-in-part of application No. 10/775,523, filed on Feb. 9, 2004, now Pat. No. 7,539,797.

(51) Int. Cl.
*G06F 13/12* (2006.01)
*G06F 13/38* (2006.01)

(52) U.S. Cl. .............. 710/74; 710/52; 710/56; 710/62; 710/65; 710/71; 370/229; 370/230; 714/5; 714/6; 714/7; 713/300; 713/320

(58) Field of Classification Search .......... 710/62, 710/65, 74, 52, 56, 71; 711/151; 713/300, 713/320; 714/5–7; 370/229, 230
See application file for complete search history.

(56) References Cited

U.S. PATENT DOCUMENTS

| 5,440,752 | A | 8/1995 | Lentz et al. |
| 6,247,100 | B1 | 6/2001 | Drehmel et al. |
| 6,388,590 | B1 | 5/2002 | Ng |
| 6,434,620 | B1 | 8/2002 | Boucher et al. |

(Continued)

FOREIGN PATENT DOCUMENTS

JP          1338648   A   *   12/1999

(Continued)

OTHER PUBLICATIONS

Serial ATA: High Speed Serialized AT Attachment, Rev. 1.0, Aug. 29, 2001. pp. 12, 87-88, 111, 117-124.*

(Continued)

*Primary Examiner*—Tammara Peyton
(74) *Attorney, Agent, or Firm*—Maryam Imam; IPxLaw Group LLP

(57) ABSTRACT

An embodiment of the present invention includes a switch employed in a system having two hosts and a device and for coupling two or more host ports to a device. The switch includes a power signal control circuit generating a power signal for use by the device in receiving power for operability thereto, the power signal control circuit responsive to detection of inoperability of the device and in response thereto, toggling the power signal to the device while avoiding interruption to the system.

15 Claims, 22 Drawing Sheets

U.S. PATENT DOCUMENTS

| | | | |
|---|---|---|---|
| 6,763,402 | B2 | 7/2004 | Talati |
| 6,915,363 | B2 * | 7/2005 | Wood et al. .................... 710/74 |
| 7,154,905 | B2 | 12/2006 | Shin et al. |
| 7,328,356 | B2 * | 2/2008 | Igari ......................... 713/320 |
| 7,392,333 | B2 * | 6/2008 | Chiu ........................... 710/62 |
| 7,552,289 | B2 * | 6/2009 | Hoch et al. ................. 711/151 |
| 7,634,375 | B1 * | 12/2009 | Pakzad et al. ............... 702/108 |
| 2002/0038436 | A1 * | 3/2002 | Suzuki .......................... 714/6 |
| 2003/0033465 | A1 | 2/2003 | Chien |
| 2003/0131166 | A1 | 7/2003 | Utsunomiya et al. |

FOREIGN PATENT DOCUMENTS

| | | | |
|---|---|---|---|
| JP | 2000105674 A | * | 4/2000 |
| TW | 507896 | | 10/2002 |

OTHER PUBLICATIONS

Klaus-Peter Deyring, Serial ATA: High Speed Serialized AT Attachment, Serial ATA Workgroup, Jan. 7, 2003, p. 1-35, Santa Cruz, USA, XP002393220.

Robert C. Elliot, Working Draft American National Standard: Information Technology Serial Attached SCSI—1.1 (SAS-1.1), Project T10/1601-D; Rev. 9e Jul. 24, 2005, Houston, Texas, USA; Reference No. ISO/IEC 14776-151:200x.

Robert C. Elliot, Working Draft American National Standard: Information Technology Serial Attached SCSI—2 (SAS-2), Project T10/1760-D; Rev. 6 Sep. 22, 2006, Houston, Texas, USA, Reference No. ISO/IEC 14776-152:200x.

SATA IO Board Members: Dell Computer Corporation, Hewlett Packard Corporation, Hitachi Packard Corporation, Hitachi Global Storage Technologies, Inc., Intel Corporation, Maxtor Corporation, Seagate Technology, Vitesse Semiconductor Corporation, Serial ATA International Organization: Serial ATA Revision 2.5, Oct. 27, 2005.

* cited by examiner

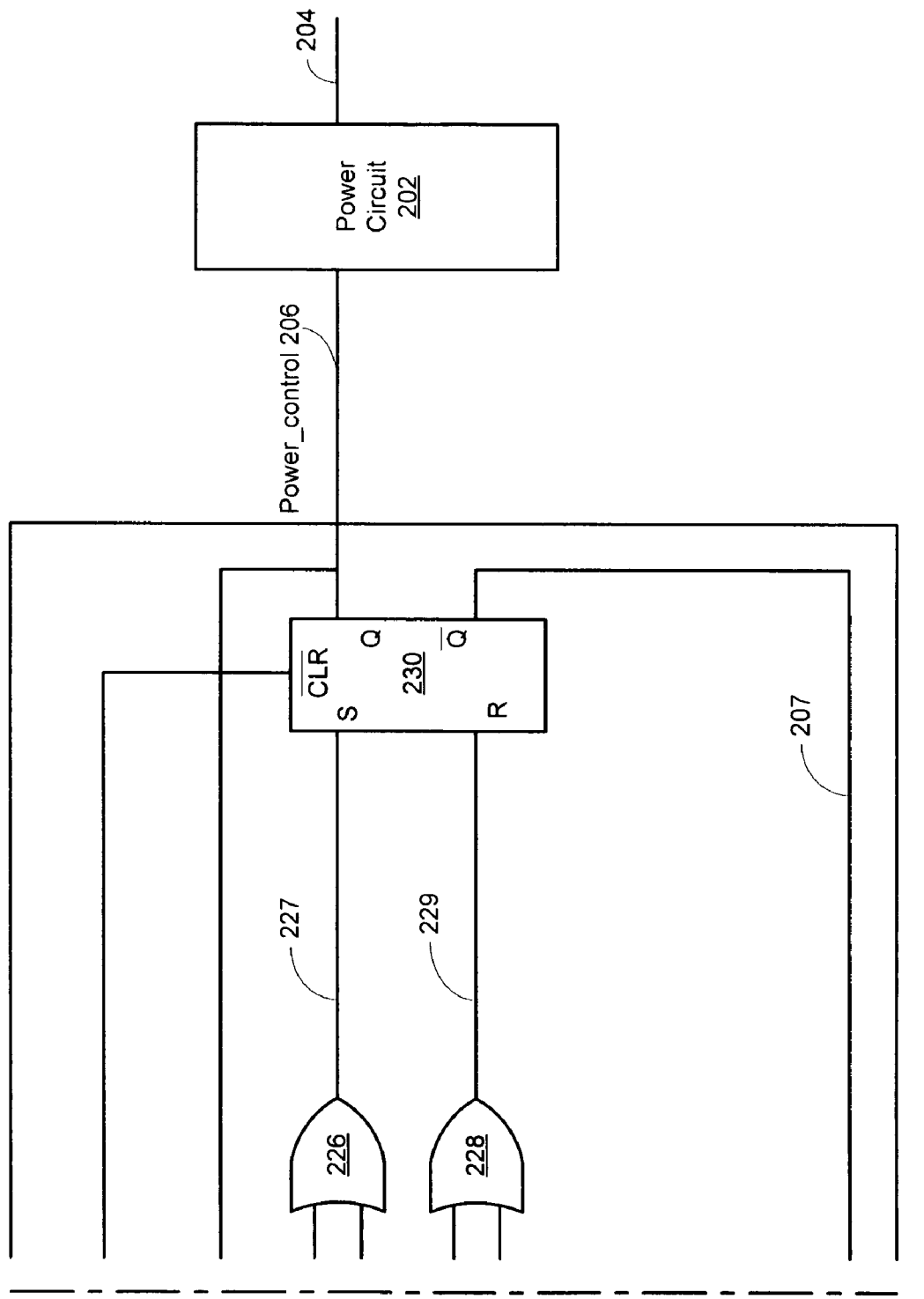
FIG. 2b(ii)

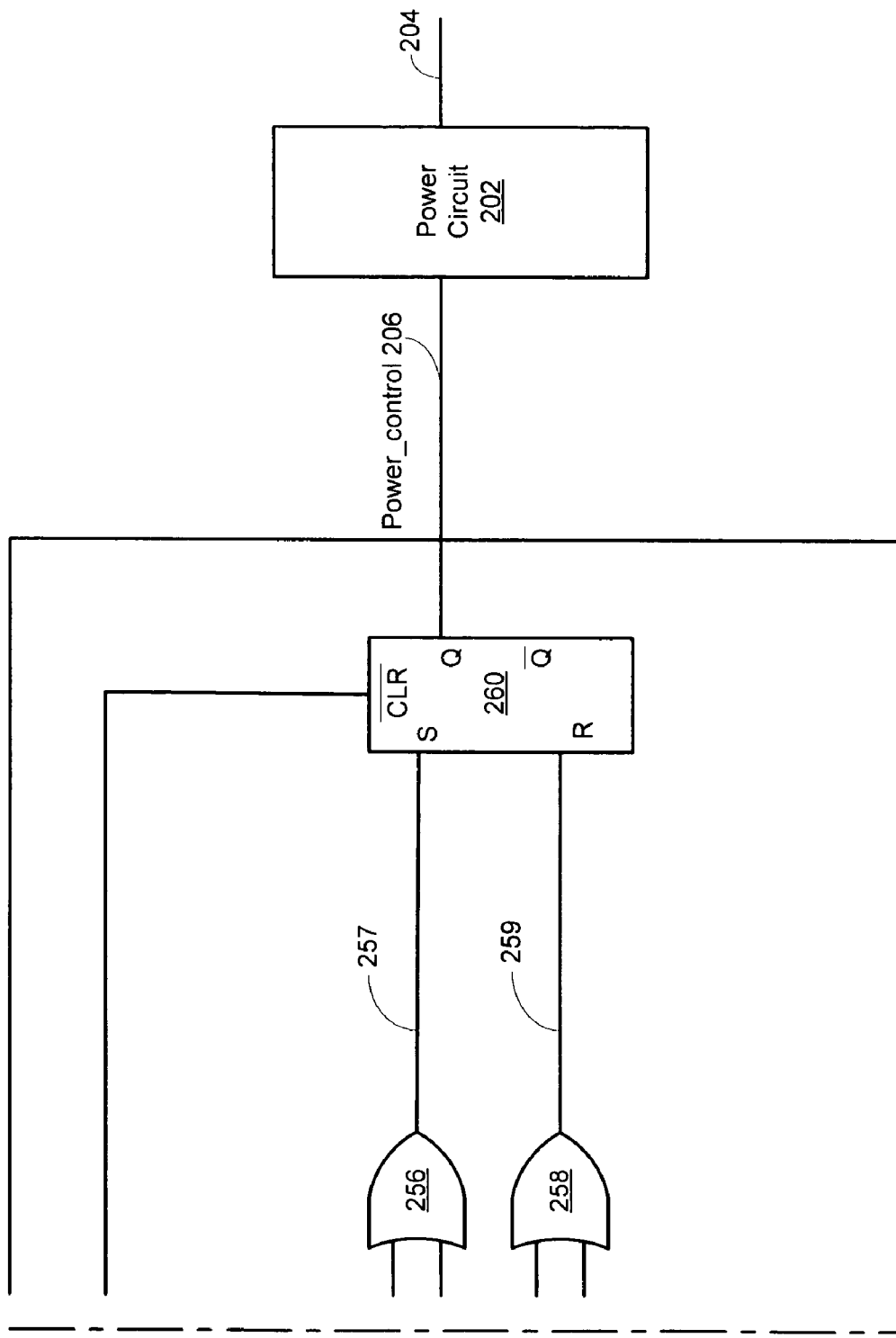
FIG. 2c(ii)

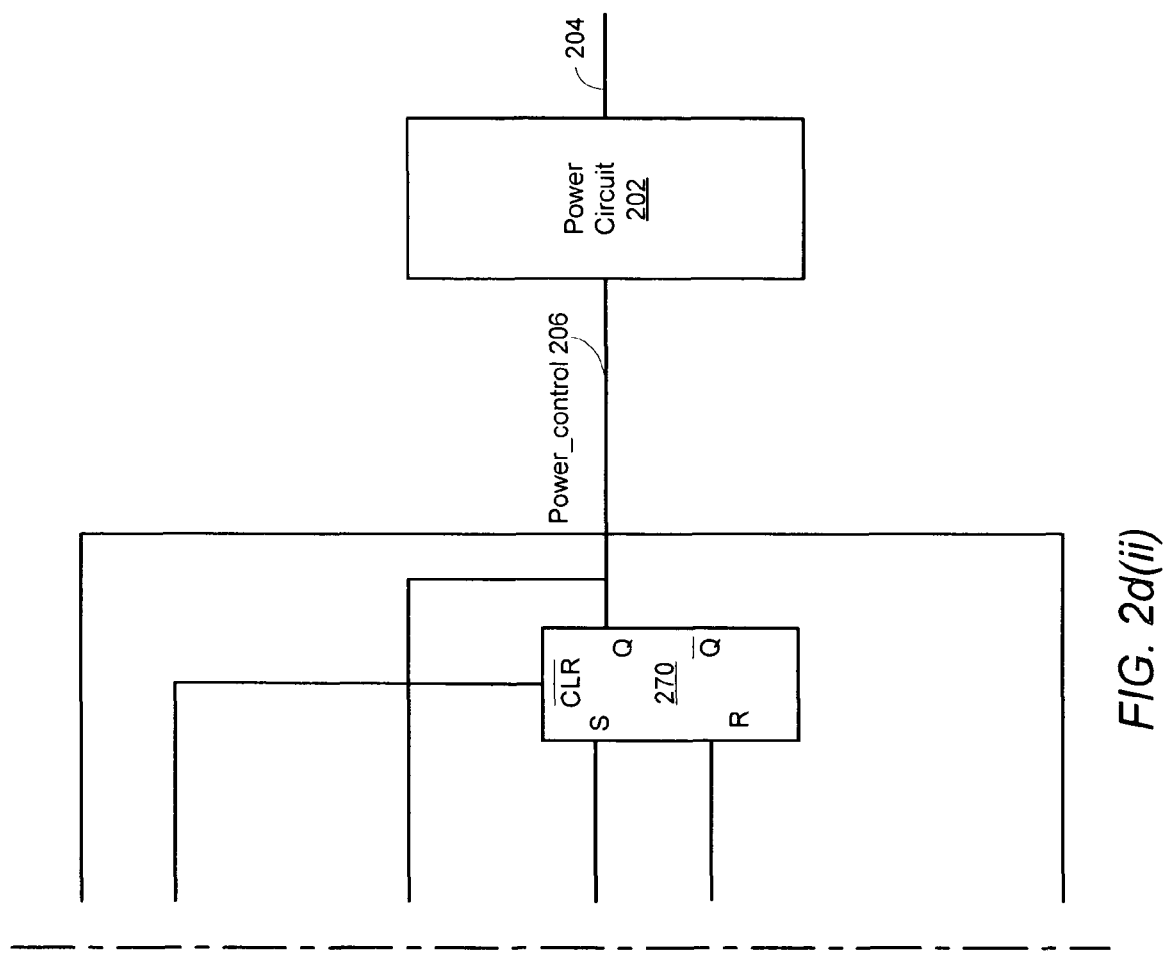

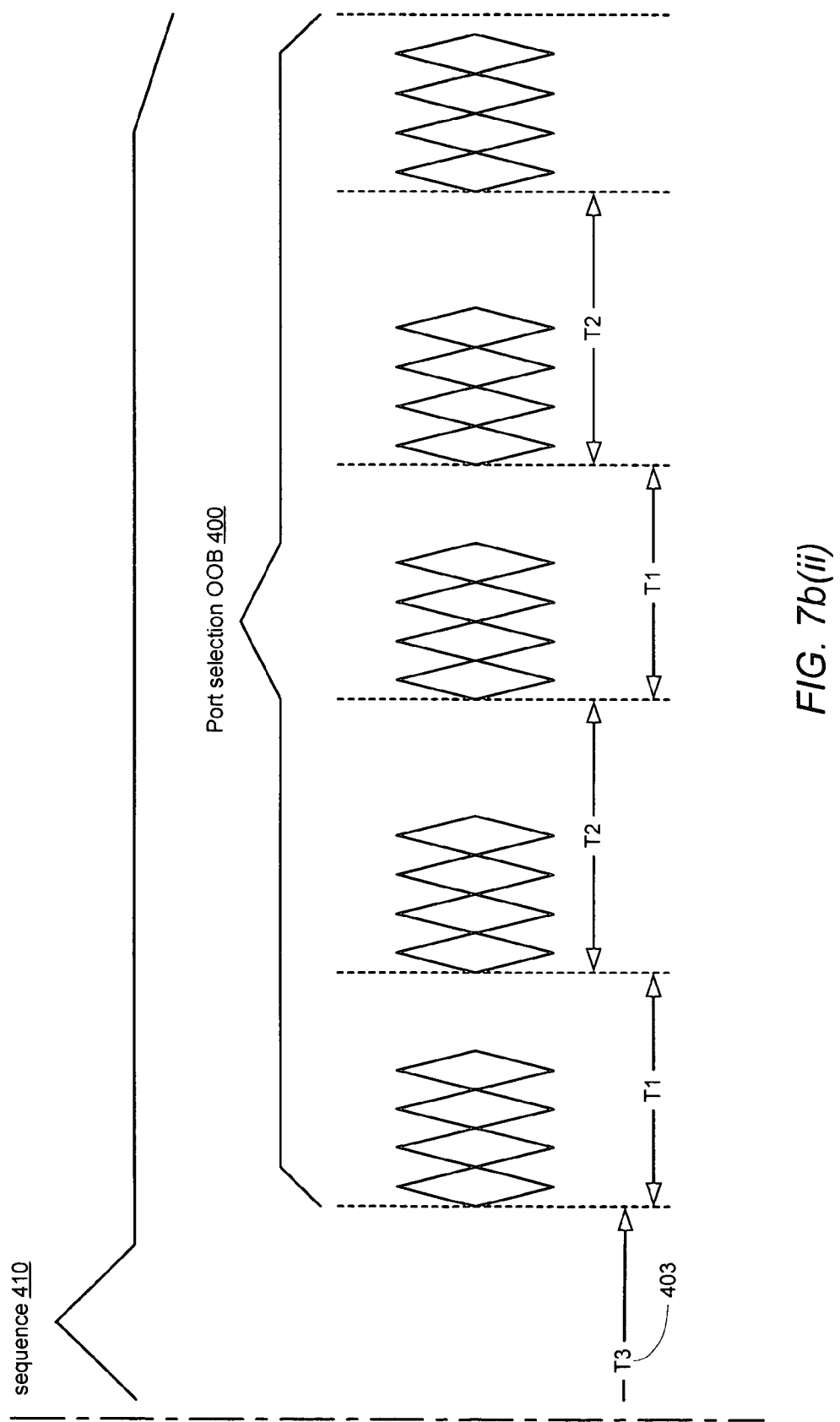
FIG. 7b(ii)

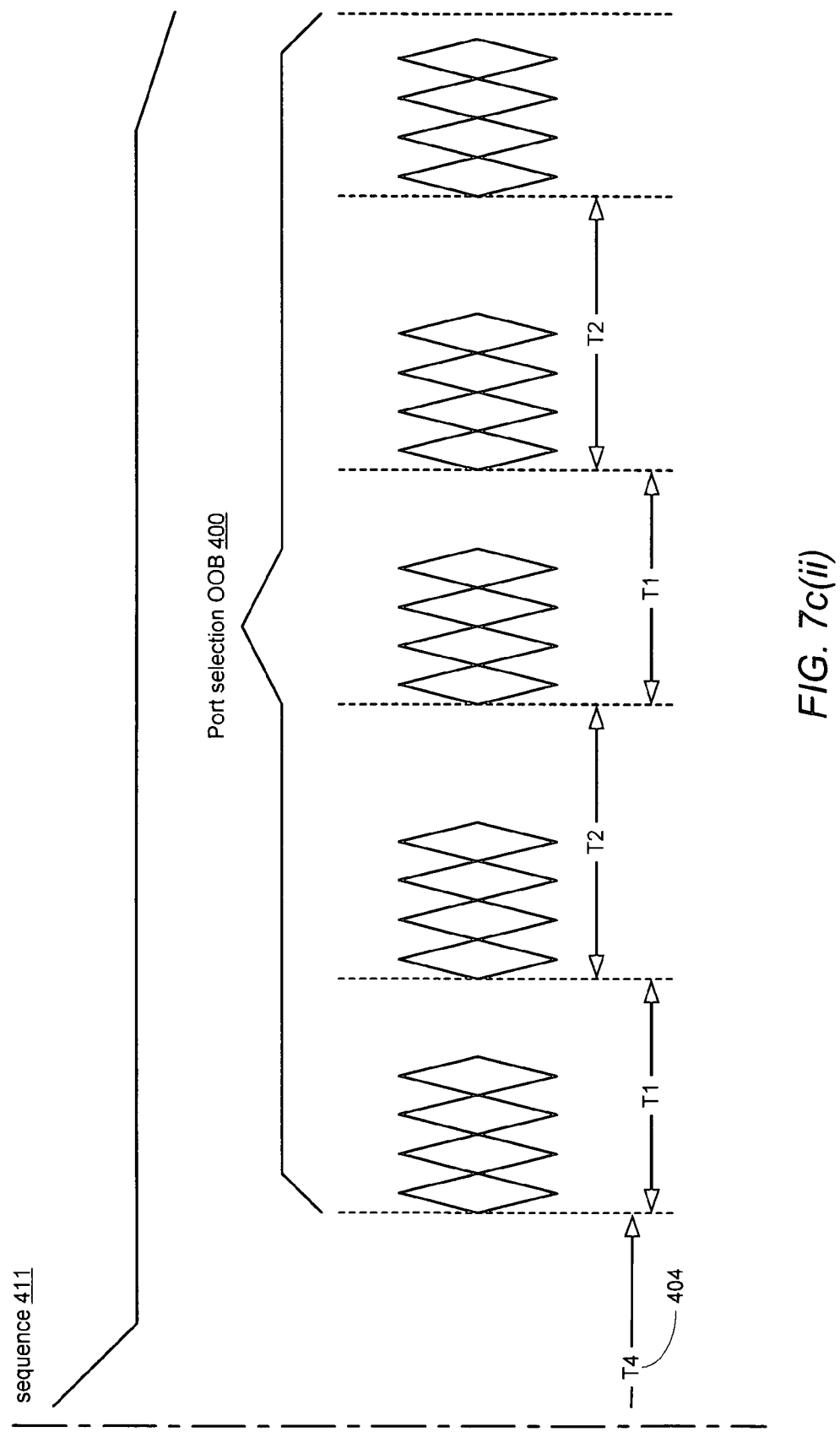
FIG. 7c(ii)

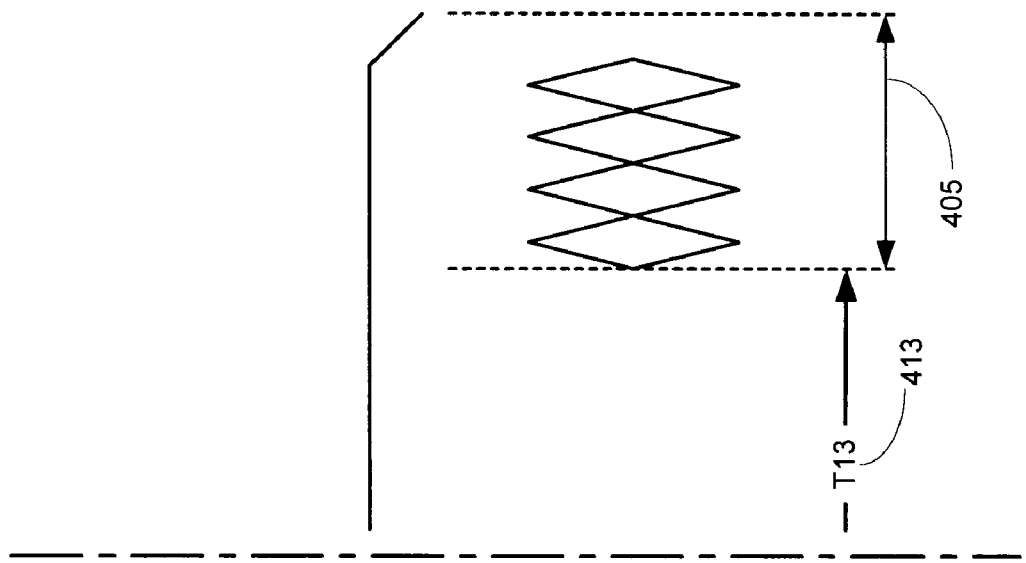
FIG. 7d(ii)

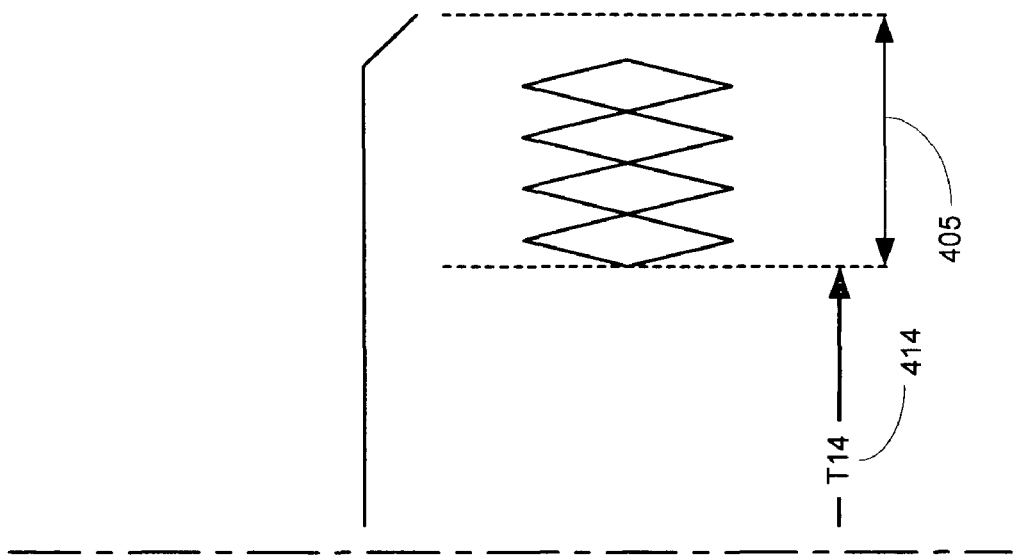
FIG. 7e(ii)

| | 0 | 1 | 2 | 3 | 4 |
|---|---|---|---|---|---|
| | FIS Type (27h) 510a | Reserved (0) C R R 510b | Command 510c | Features 510d | |
| | Sector Number 511a | Cyl Low 511b | Cyl High 511c | Dev / Head 511d | |
| | Sector Number (exp) 512a | Cyl Low (exp) 512b | Cyl High (exp) 512c | Features (exp) 512d | |
| | Sector Count 513a | Sector Count (exp) 513b | Reserved (0) 513c | Control 513d | |
| | Reserved (0) | Reserved (0) | Reserved (0) | Reserved (0) | |

FIG. 8a Register FIS Host to Device

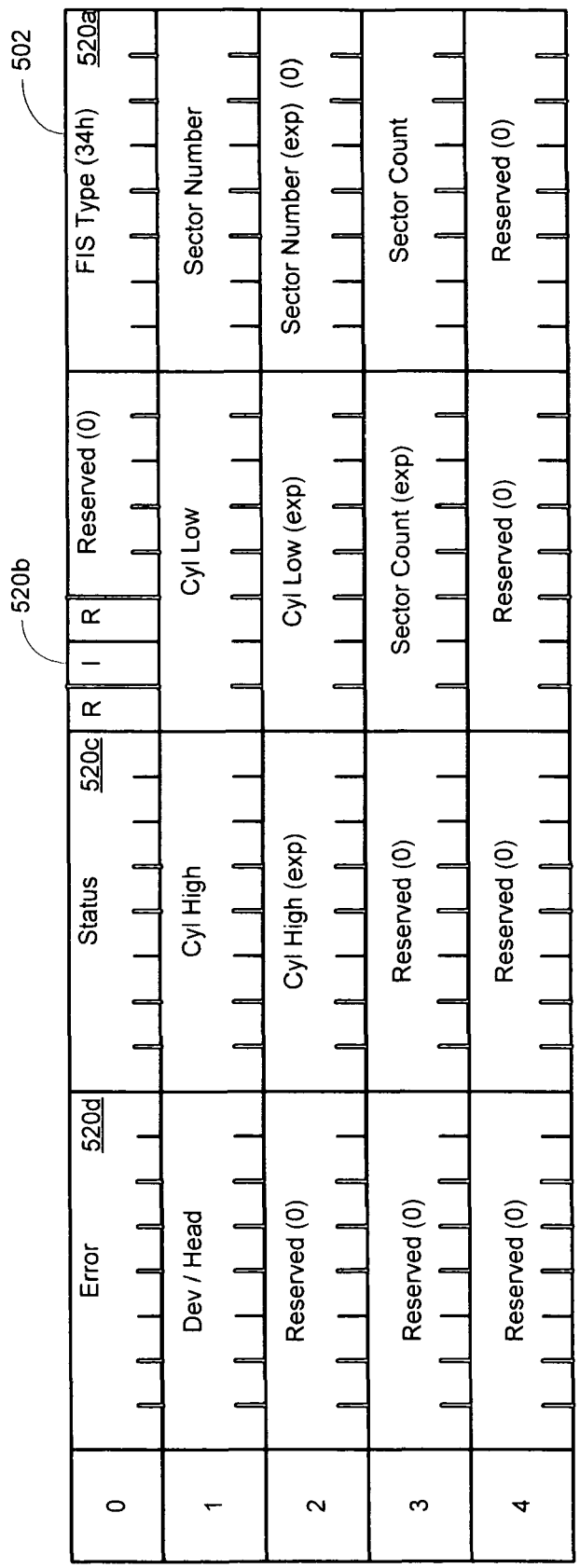
FIG. 8b Register FIS Device to Host

SERIAL ADVANCED TECHNOLOGY ATTACHMENT (SATA) SWITCH THAT TOGGLES WITH POWER CONTROL TO HARD DISK DRIVE WHILE AVOIDING INTERRUPTION TO SYSTEM

CROSS REFERENCE TO RELATED APPLICATION

This application is a continuation-in-part of my previously-filed U.S. patent application Ser. No. 10/986,732, filed on Nov. 12, 2004 now U.S. Pat. No. 7,526,587 and entitled "Dual Port Serial Advanced Technology Attachment (SATA) Disk Drive", which is a continuation-in-part of my U.S. patent application Ser. No. 10/755,521, filed on Feb. 9, 2004 now U.S. Pat. No. 7,523,236 and entitled "Switching Serial Advanced Technology Attachment (SATA)" and is a continuation-in-part of my U.S. patent application Ser. No. 10/775,523, filed on Feb. 9, 2004 now U.S. Pat. No. 7,539,797 and entitled "Route Aware Serial Advanced Technology Attachment (SATA) Switch", the disclosures of which are incorporated herein as though set forth in full.

FIELD OF THE INVENTION

The present invention relates generally to Serial Advanced Technology Attachment ATA (SATA) switches and, in particular, to switches having two host ports and one device port allowing for access by both host ports, the device port being coupled to a storage device, such as a hard disk drive, the switch further having the capability to control power to the storage device.

BACKGROUND OF THE INVENTION

As discussed in prior related patent applications/patents, referenced hereinabove, as listed hereinabove and incorporated herein by reference, a switch or multiplexer (Mux) is used to couple two or more host ports to a target device. A simple failover switch or Active Passive Mux (APMux) allows two different hosts to connect to the same device, however, when one host is connected to the device, the other host can not access the device. An Active switch or Active Active Mux (AAMux) allows concurrent access by both hosts to the device. "Switch or Mux", as used herein below, refers to either an Active Switch (AAMux) or a Simple Failover Switch (APMux).

Now, briefly problems associated with current apparatus and method are discussed.

In the case where a target device is a storage device, such as a hard disk drive (HDD), is used, power control becomes an issue in today's technology. More specifically, HDDs are commonly known to hang-up or become nonoperational for a variety of reasons, which are well known in the industry. Upon the occurrence of a hang-up, error recovery is performed in an attempt to render the HDD and the system in which the HDD is being utilized operational. In the event of the error recovery failing, as a last step, recovery of the HDD is performed, requiring turning the power to the HDD 'off' and then 'on' while the rest of the system in which the HDD is being utilized remains operational.

In light of the foregoing, it is desirable to interrupt power to a HDD without interrupting power to the rest of the system in which the HDD resides, the system including a switch coupling at least two host ports to a target (or storage) device, such as the HDD, and the interruption of power to the HDD being the last step in an error recovery process, initiated from the HDD becoming inoperational.

The SATA and SAS use the same connector, to allow use of either a SATA or SAS device in the same system. SATA uses only one link of the connector whereas SAS uses both links on the connector. That is, when disk drives are used in different settings, the use of a mux may or may not be necessary. A specific example is in the context or application of what is commonly known as "Just a Bunch of Disks" (JBOD), or Disk Arrays which is essentially a large number of removable disks (disk array) or HDDs that are in the same enclosure, connected to a backplane and coupled to a common system interface. In JBODs, using SATA or SAS HDDs interchangeably is desirably. Such JBODs will be referred to as SAS/SATA JBODs. Yet another problem associated with the use of SATA switches on the backplane of SAS/SATA JBOD is the need to bypass the switch on the backplane when a SAS HDD is used.

other systems in a variety of different ways. One way is using the disk array in SATA, another is using the disk array in SAS.

Currently, a disk array JBOD requiring SATA coupling as well as SAS coupling needs two different connections therefor, one for the SATA coupling and another for the SAS coupling. Specifically, SATA uses one link of a connector, whereas, SAS uses both links of a connector and SATA requires a mux, whereas, SAS does not.

Therefore, the need arises for an apparatus and method of bypassing an active switch so as to allow using the same connection to connect two or more host ports on one side of a JBOD to either of the SATA and the SAS target device.

SUMMARY OF THE INVENTION

Briefly, an embodiment of the present invention includes a switch employed in a system having two hosts and a device and for coupling two or more host ports to a device. The switch includes a power signal control circuit generating a power signal for use by the device in receiving power for operability thereto, the power signal control circuit responsive to detection of inoperability of the device and in response thereto, toggling the power signal to the device while avoiding interruption to the system.

IN THE DRAWINGS

FIG. 2b illustrates a power control circuit 203b that functionally operates in the same manner as the power control circuit of FIG. 2a.

Figure 5:
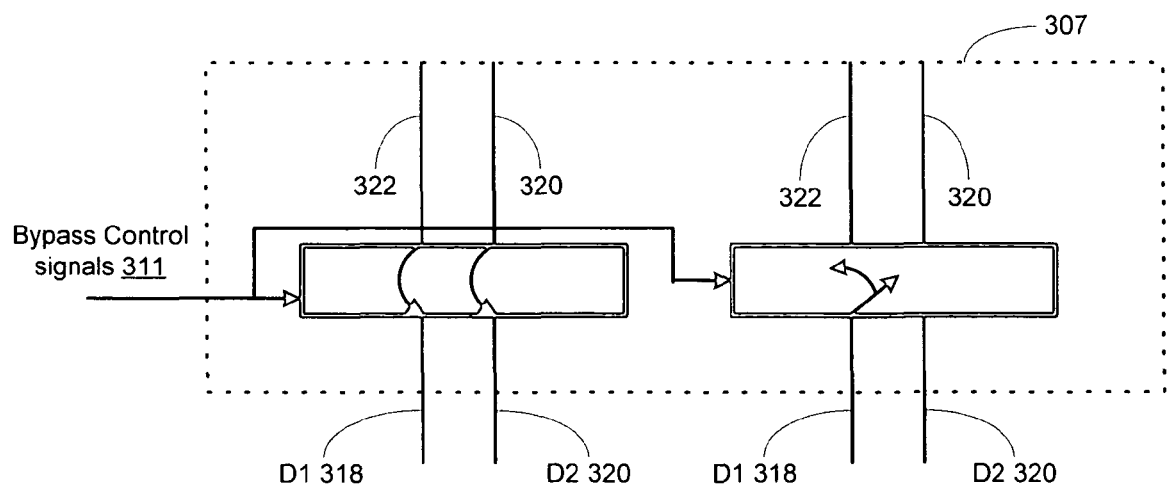

FIG. 5 shows a functional representation of the relationship between the links 322 and 324 and the D1 output 318 and the D2 output 320, respectively.

Figure 6A:
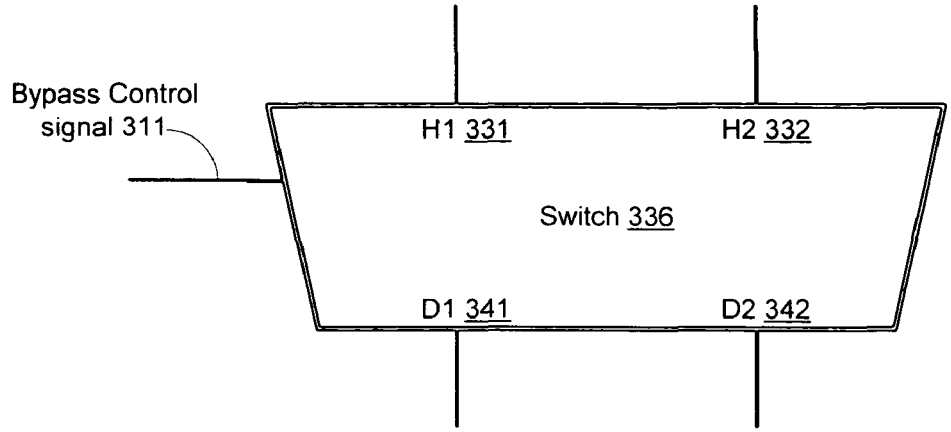

FIG. 6a shows the switch 336 in accordance with an embodiment of the present invention.

Figure 6B:
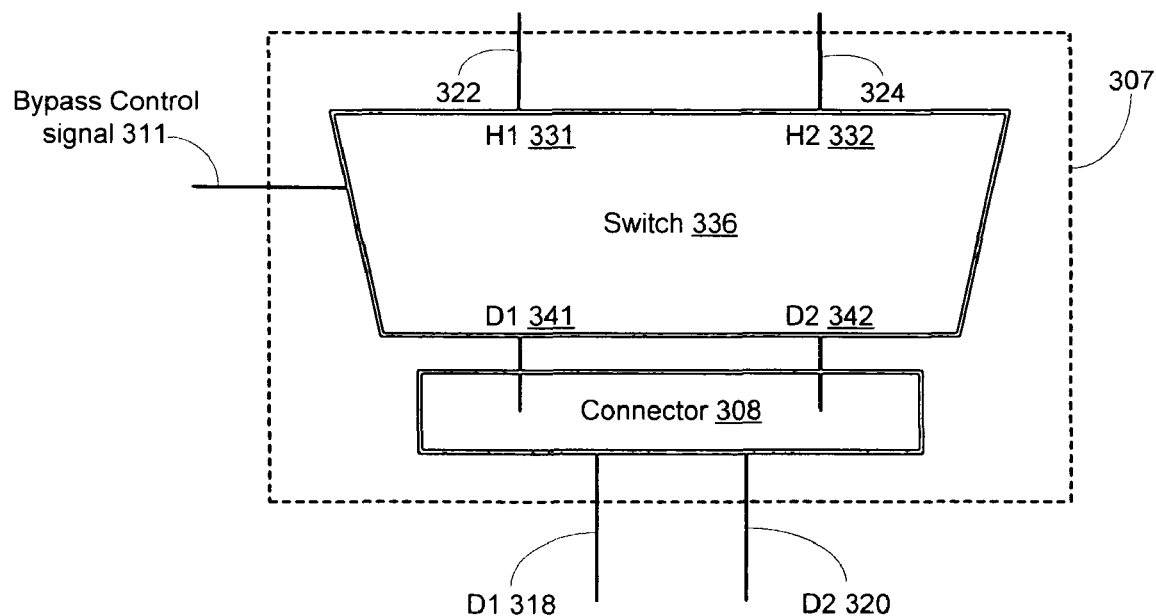

FIG. 6b shows further details of the connection circuit 307 in accordance with an embodiment of the present invention.

Figure 7A:
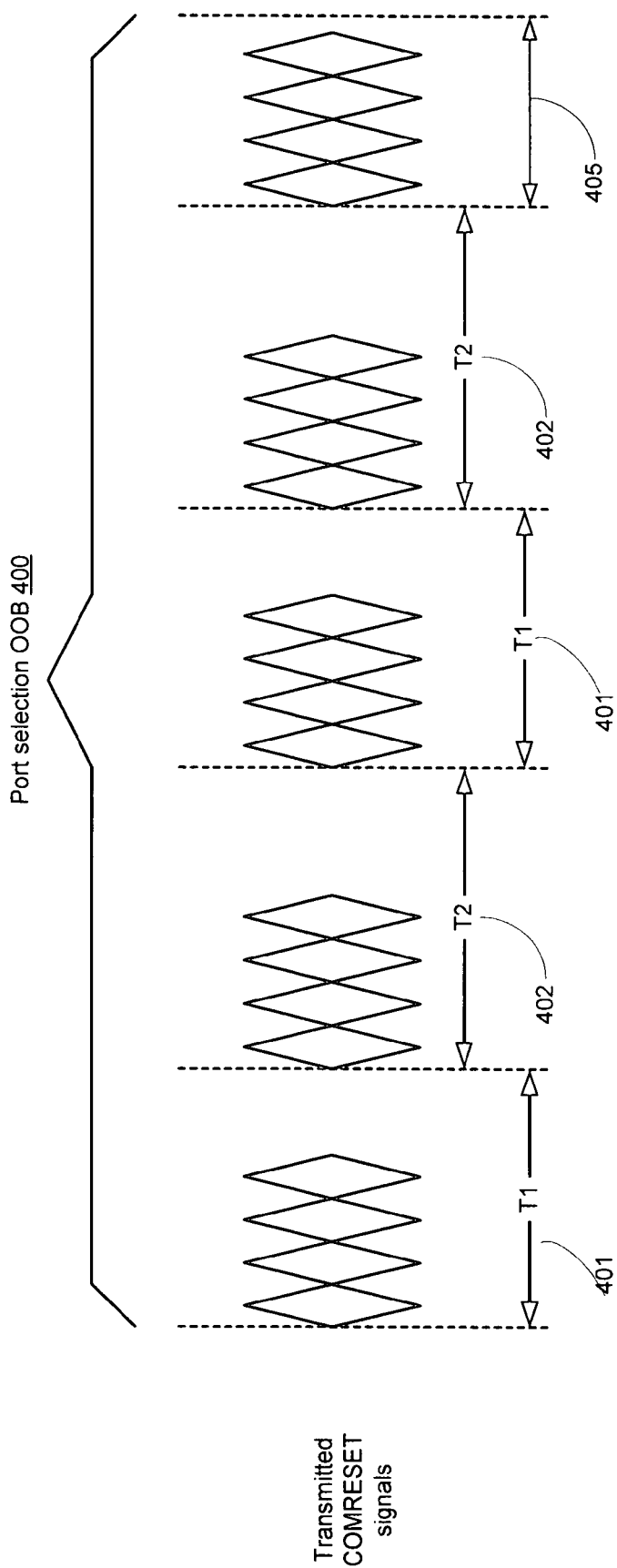

FIG. 7a shows the PS OOB sequence 400 in accordance with an embodiment of the present invention.

Figure 7B:
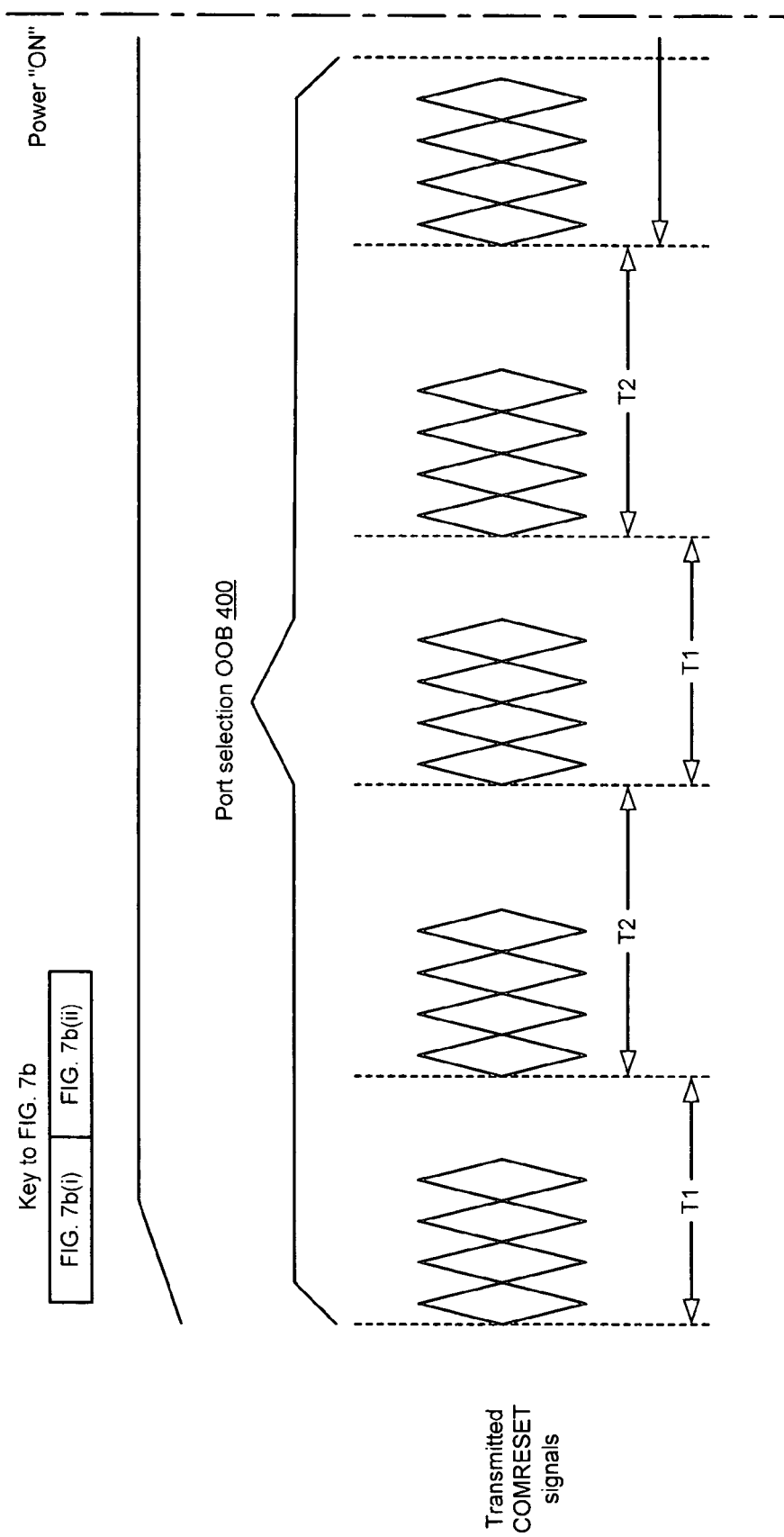
Figure 7C:
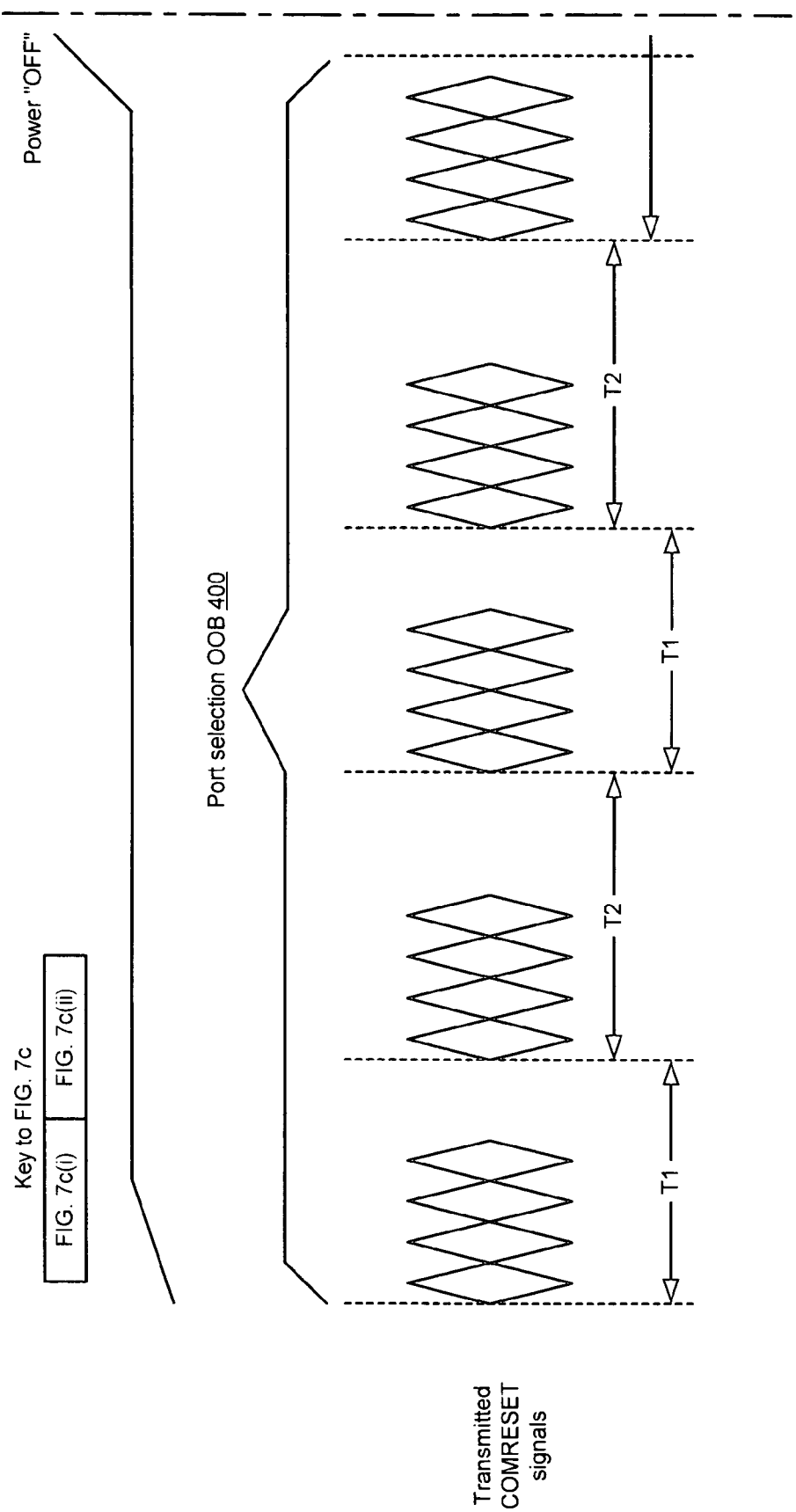

FIGS. 7b and 7c show examples of predefined sequences of OOB signals.

Figure 7D:
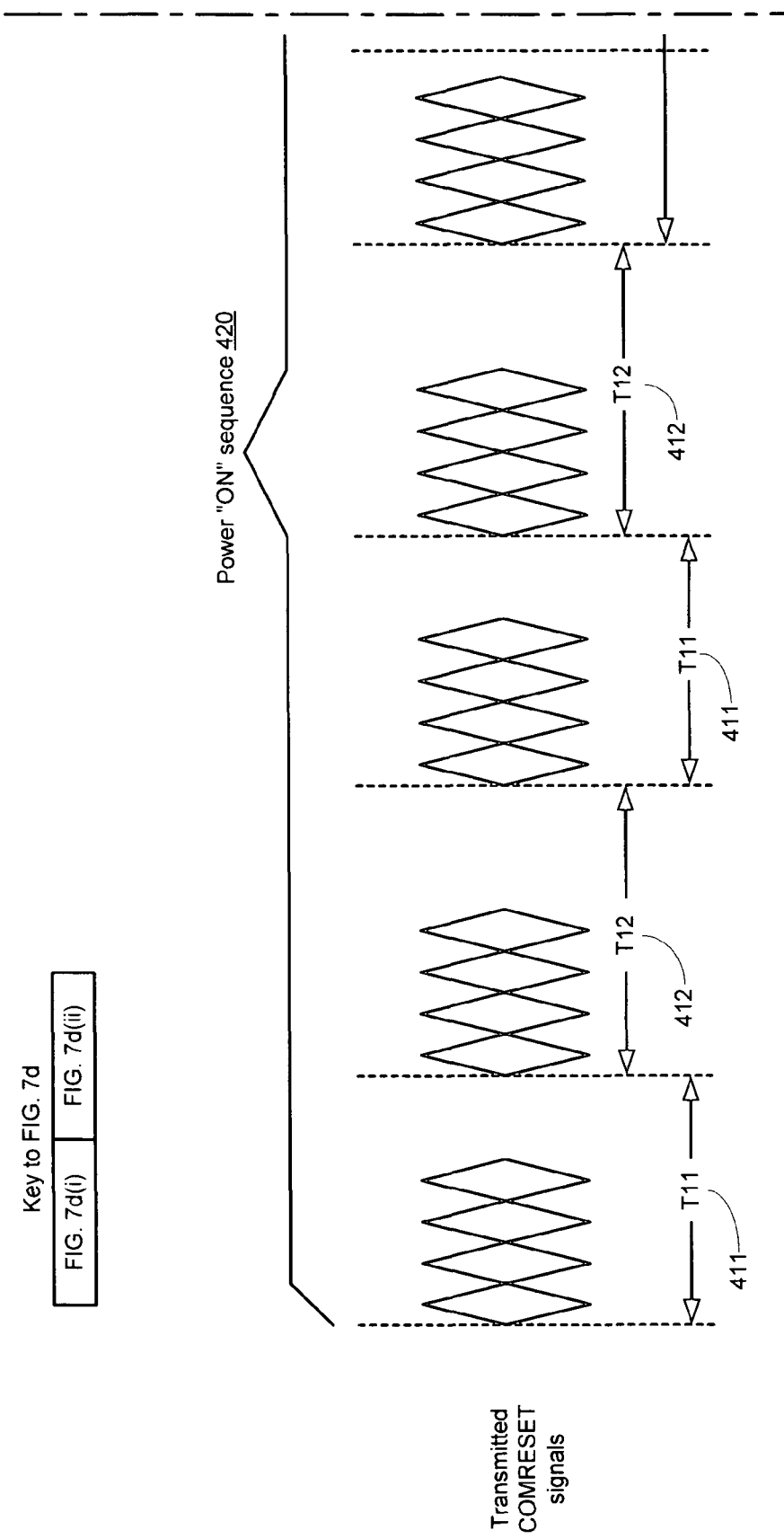
Figure 7E:
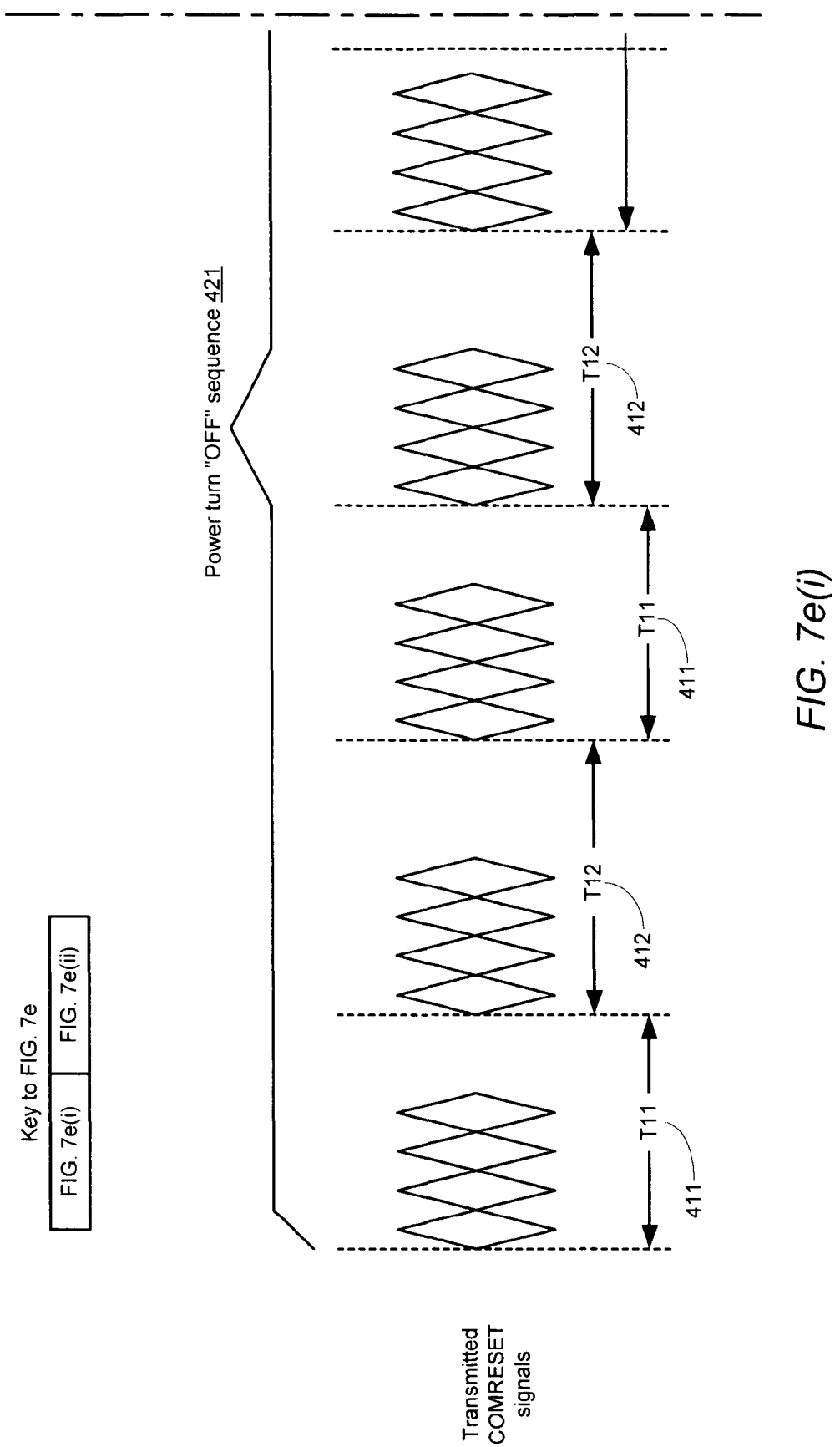

FIGS. 7d and 7e show an example of a sequence of COMRESET signal to turn power "on" or "off", respectively.

FIG. 8a shows an exemplary host to device register FIS data structure 501 in accordance with an embodiment of the present invention.

FIG. 8b shows an exemplary device to host register FIS data structure 502 in accordance with an embodiment of the present invention.

DETAILED DESCRIPTION OF THE PREFERRED EMBODIMENTS

Figure 1:
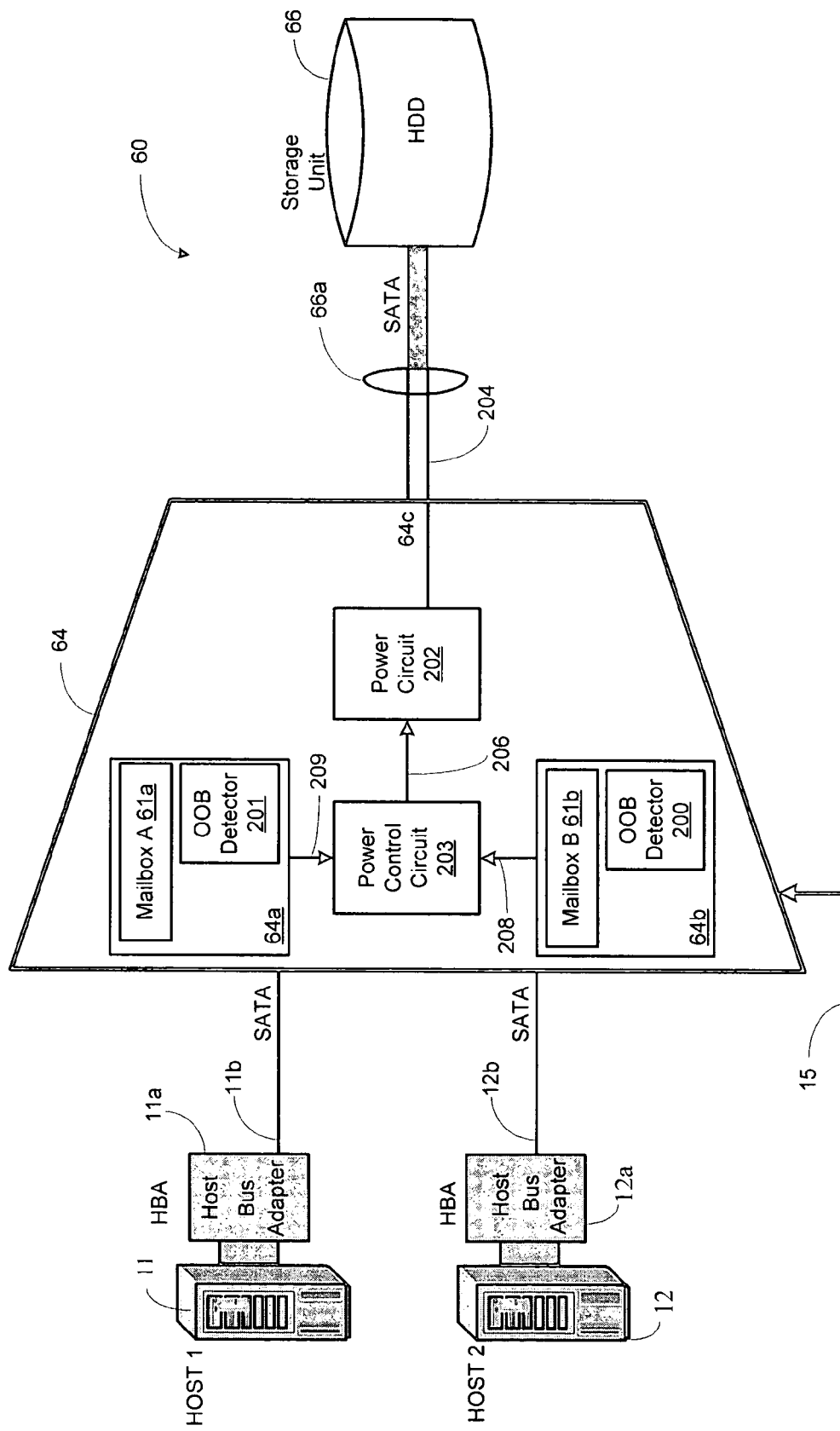
FIG. 1 shows a system 60 utilizing the switch 64 in accordance with an embodiment of the present invention.

FIG. 1 shows a system 60 utilizing the switch 64 in accordance with an embodiment of the present invention. The switch may be SATA or ATA. Further discussions and figures relating to the switch and some of the remaining structures of FIG. 1, such as the ports 64a and 64b and the host bus adapters 11a and 12a are included in U.S. patent application Ser. No. 10/775,521, entitled "Switching Serial Advanced Technology Attachment (SATA)", filed on Feb. 9, 2004 by Siamack Nemazie, the contents of which are incorporated herein as though set forth in full.

The switch 64 may be an active active mux (AAMux). The switch 64 comprises of a SATA port 64a coupled to a host 11, a SATA port 64b coupled to a host 12 and a SATA port 64c coupled to a storage unit 66, which may be a SATA HDD. In system 60, the storage unit 66 has a SATA link and the SATA port 64c is coupled to a storage unit 66 via a SATA link 66a. However, the storage unit 66 may have a ATA link such that the port 64c is a ATA port and the link 66a is a ATA link.

In the embodiment of FIG. 1, the hosts 11 and host 12 access the storage unit 66 through the switch 64. The host 11 accesses the switch 64 through the host bus adapter 11a and the host 12 accesses the switch 64 through the host bus adapter 12a. Thus, the switch 64 allows for access by the hosts 11 and host 12 to the target device, i.e. the storage unit 66, wherein concurrent access is allowed from two or more host ports to a single-ported storage unit connected to the device port of a switch via a SATA link or an ATA link.

"Host", as used herein below, refers to either the host II or host 12 of FIG. 1.

In FIG. 1, the switch 64 is shown to include an out of band (OOB) detector 200, shown coupled to a power circuit 202, through the power control circuit 203 and power control signal 206. The power circuit 202 is shown coupled to the storage unit 66, through a power connection 204 which is part of the SATA link 66a. The OOB detector 200 presents one of the ways of toggling power to the storage unit 66, through the power connection 204, as will be clear shortly. As the OOB detector 200 is an existing circuit within the system 60, there is no need for additional circuitry or even software to effectuate the toggling process. This clearly saves costs in allowing an already existing system to be used for a purpose not currently used, i.e. toggling power.

The storage unit 66, as stated previously, may be an HDD, which is prone to hang-ups or times of inoperation due to a wide variety of reasons well-known in industry. Upon recovery from a hang-up situation, error recovery is performed and if the latter process fails, the HDD is preferably turned 'off' and 'on' (toggled) without interruption of power to the rest of the system 60, e.g. operation of the rest of the system 60. This is important in that normal operation continues without any disruption to the operation of the rest of the system 60 even though power to the storage unit 66 is interrupted.

A condition used to detect a hang-up of the storage unit 66 is detection of an issued, yet incompletely processed command within a predetermined time period and detection of a failed 'soft' reset or 'hard' reset as well as failed link re-initialization. A 'soft' reset is initiated via setting a control bit in the task file while a 'hard' reset is initiated by asserting signals or sequences. Failure to reset or link re-initialize refers to failure to properly recover from a hang-up situation.

Once the foregoing condition is detected, one of the methods of the present invention is used to toggle (or turn 'off' or turn 'on') power to the storage unit 66. One method is to utilize the Port Select OOB (PS OOB) sequence, which is clearly already in existence, as is the OOB detector 200, to toggle the power control signal 206, which ultimately results in toggling the signal carried on the power connection 204, to the storage unit 66. The PS OOB sequence is effectively used to select the 'active' port when using an APMux and to toggle power to the storage unit 66 when using an AAMux. The PS OOB sequence consists of two sequences of two COMRESET intervals comprising a total of five COMRESET bursts with four inter-burst delays. FIG. 7a shows the PS OOB sequence 400 comprising two sequences of two COMRESET intervals consisting of T1 interval 401, and T2 interval 402. where delay T1 is nominally 2 ms and in the range of 1.6 to 2.4 ms and where delay T2 is nominally 8 ms and in the range of 7.6 to 8.4 ms Another method to toggle power is to use a sequence of COMRESET bursts to turn "off" power and another sequence of COMMREST bursts to turn "on" power. Such sequence must not occur during normal operation. One such sequence is to use two back to back PS OOB with two delays between the two PS OOB sequences. If the delay is between a first range then the sequence is designated to turn "off" power and if the delay is between a second range the sequence is designated to turn power "on".

Figure 2A:
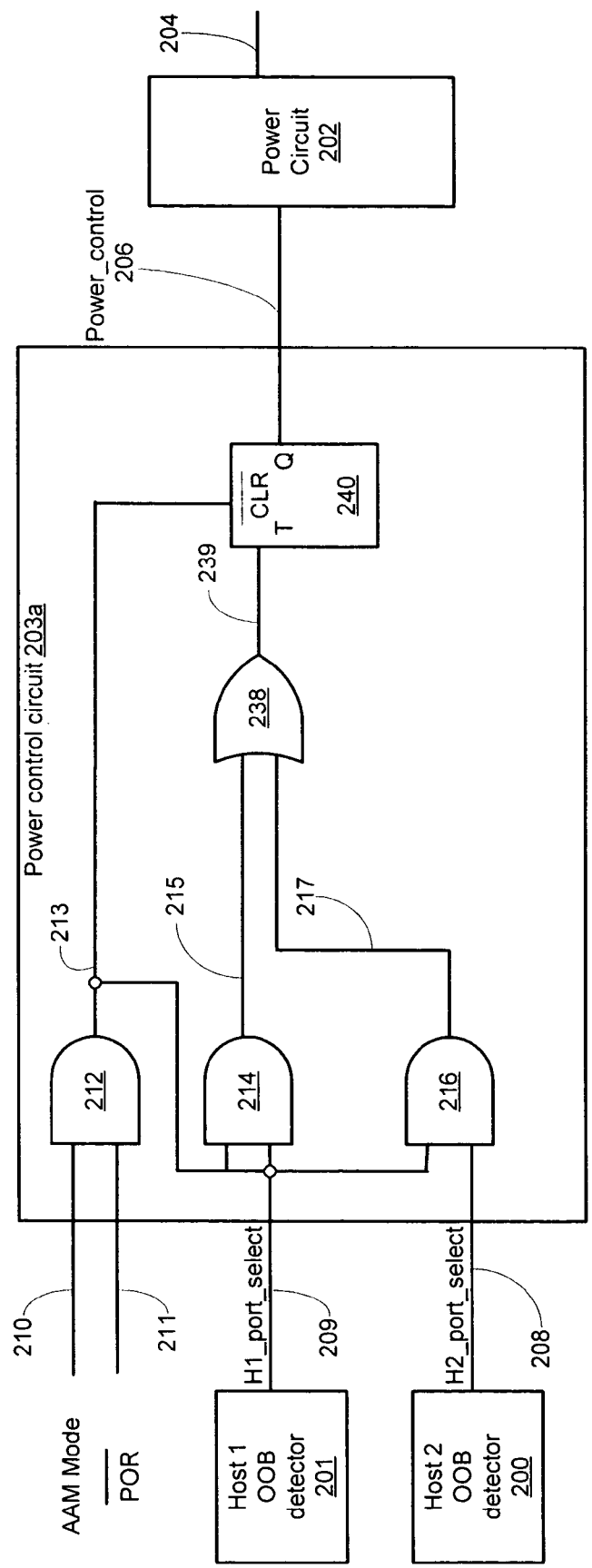
FIG. 2a shows further details of the switch 64 of FIG. 1 in accordance with an embodiment of the present invention.
Figure 2B:
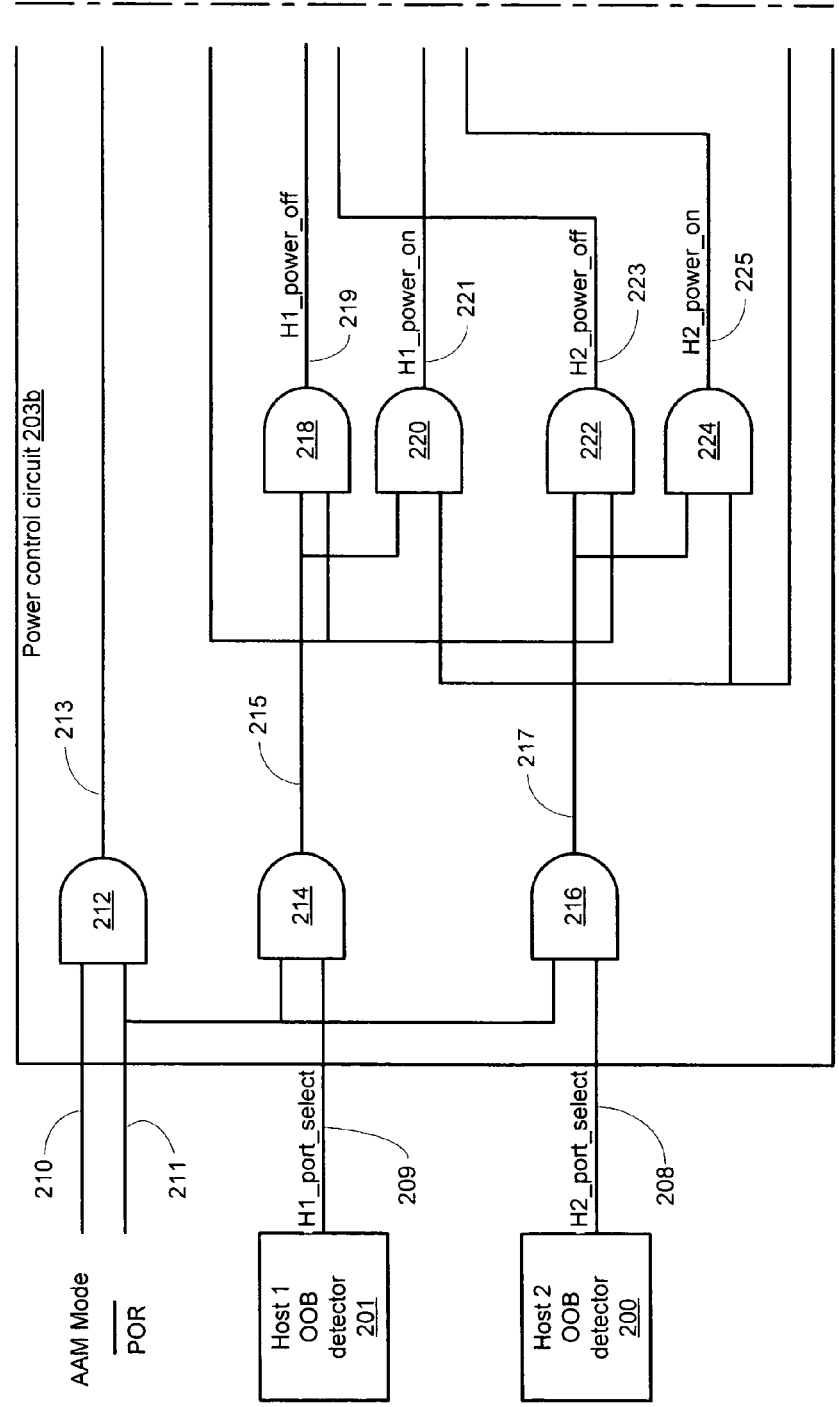

FIG. 2a shows further details of the switch 64 of FIG. 1 in accordance with an embodiment of the present invention. In FIG. 2a, a power control circuit 203a is shown to be coupled to the OOB detector 200, OOB detector 201 and the power control circuit 202. The power control circuit 203a is shown, in FIG. 2a, to include a T type flip flop 240, coupled to the host port select signal 208 and host port select signal 209 and generating a power control signal 206. The T flip flop 240 is held in reset condition when power on reset signal 211 is asserted (active low) or when active active mode select signal 210 is deasserted (low). In operation when a PS OOB is detected the corresponding host port select signal 208, or 209 is asserted which will cause the state of power control circuit 203a to toggle. The active active mode select 210 configures the operation of switch 64 as APMux or AAMux. When active active mode select 210 is asserted then switch 64 is configured for AAMux operation, else if deasserted configured for APMux operation.

Power control circuit is shown to include a RS flip flop 230. When active active mode select 210 is asserted and power on reset 211 is deasserted and power control signal 206 is deasserted then if a PS OOB is detected the corresponding host port select signal 208, or 209 is asserted which will cause corresponding host power off signal 219, or 223 to be asserted which will cause the state of power control signal 206 to toggle (to asserted state). The host power off signals 219 and 223 are logically ORed by OR gate 226 to generate the set signal 227 of RS flip flop 230. When active active mode select 210 is asserted and power on reset 211 is deasserted and power control signal 206 is asserted then if a PS OOB is detected the corresponding host port select signal 208, or 209 is asserted which will cause corresponding host power on signal 221, or 225 to be asserted which will cause the state of power control signal 206 to toggle (to deasserted state). The host power on signals 221 and 225 are logically ORed by OR gate 228 to generate the reset signal 229 of RS flip flop 230.

Figure 2C:
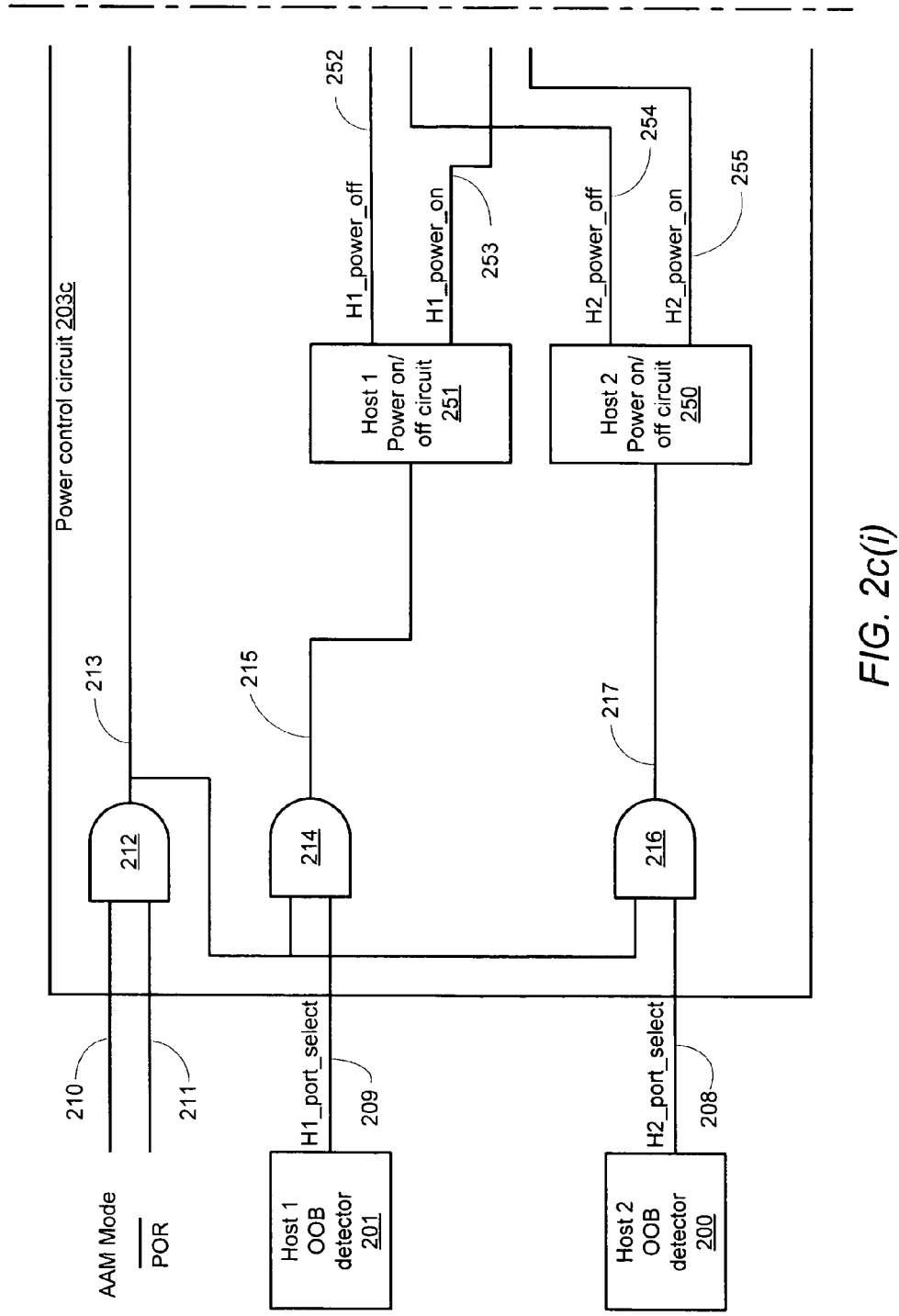
FIG. 2c shows another embodiment of present invention.

FIG. 2c shows another embodiment of present invention. In FIG. 2c, a power control circuit 203c is shown to be coupled to the OOB detector 200, OOB detector 201 and the power control circuit 202. The power control circuit 203c in FIG. 2c is shown to include a RS type flip flop 260 generating a power control signal 206, The set signal 257 of RS flip flop is coupled to the host port off signal 252 and 254, the reset signal 259 of RS flip flop 260 is coupled to host power on signal 253 and 255. The RS flip flop 260 is held in reset condition when power on reset signal 211 is asserted (active low) or when active active mode select signal 210 is deasserted (low). The power control circuit 203c is shown to include a host power on/off circuit 251 coupled to host port select signal 209 and generating host power off signal 252 and host power on signal 253. The power control circuit 203c is shown to include a host power on/off circuit 250 coupled to host port select signal 208 and generating host power off signal 254 and host power on signal 255. The host power on signals 253 and 255 are logically ORed by OR gate 258 to generate the reset signal 259 of RS flip flop 260. The host power off signals 252 and 254 are logically ORed by OR gate 256 to generate the set signal 257 of RS flip flop 260. The host power on/off circuit 250 is responsive to predefined sequences of OOB signals to generate host power on signal 253 and host power off signal 252. One such sequences, shown in FIG. 7b and FIG. 7c, use two back to back PS OOB sequences with two delays between the two PS OOB sequence. If the delay is between a first range then the sequence is designated to turn power "off" and if the delay is between a second range the sequence is designated to turn power "on". The power on sequence, shown in FIG. 7b use two back to back PS OOB sequences with delay T3 403 between the two PS OOB sequences, where delay T3 is nominally 10 ms and in the range of 9 to 11 ms. The power off sequence, shown in FIG. 7c use two back to back PS OOB sequences with delay T4 404 between the two PS OOB sequences, where delay T4 is nominally 14 ms and in the range of 13 to 15 ms It is obvious to one skilled in the art to devise other OOB sequences to turn power "on" or "off". By way of example, a sequence of COMRESET signal to turn power "on" or "off" is shown in FIGS. 7d and 7e respectively. FIG. 7d shows a sequence to turn power "on" comprising two sequences of two COMRESET intervals consisting of T11 interval 411, and T12 interval 412 followed by another COMRESET burst with inter-burst delay T13 413, comprising a total of six COMRESET bursts with five inter-burst delays, FIG. 7e shows a sequence to turn power "off" comprising two sequences of two COMRESET intervals consisting of T11 interval 411, and T12 interval 412 followed by another COMRESET bust with inter-bust delay T14 414, a comprising a total of six COMRESET bursts with five inter-burst delays. It should be noted that such sequence is unique for both AAMux and APMux. It is obvious to one skilled in the art to modify the circuits and methods of present invention for use with such sequences. It is therefore intended that any sequence of OOB signals used in conjunction with circuits and methods for turning power "on" and "off" for AAMux or APMux to fall within scope of the present invention Yet another method is to use a sequence of COMRESET to request/initiate an atomic power cycle operation. An atomic power cycle operation comprises of turning power off then waiting for a first predetermined time interval and then turning power on, and the host should wait for a second predetermined time before issuing any commands. When an atomic power cycle is in progress any command received from the other host is returned with error.

Figure 2D:
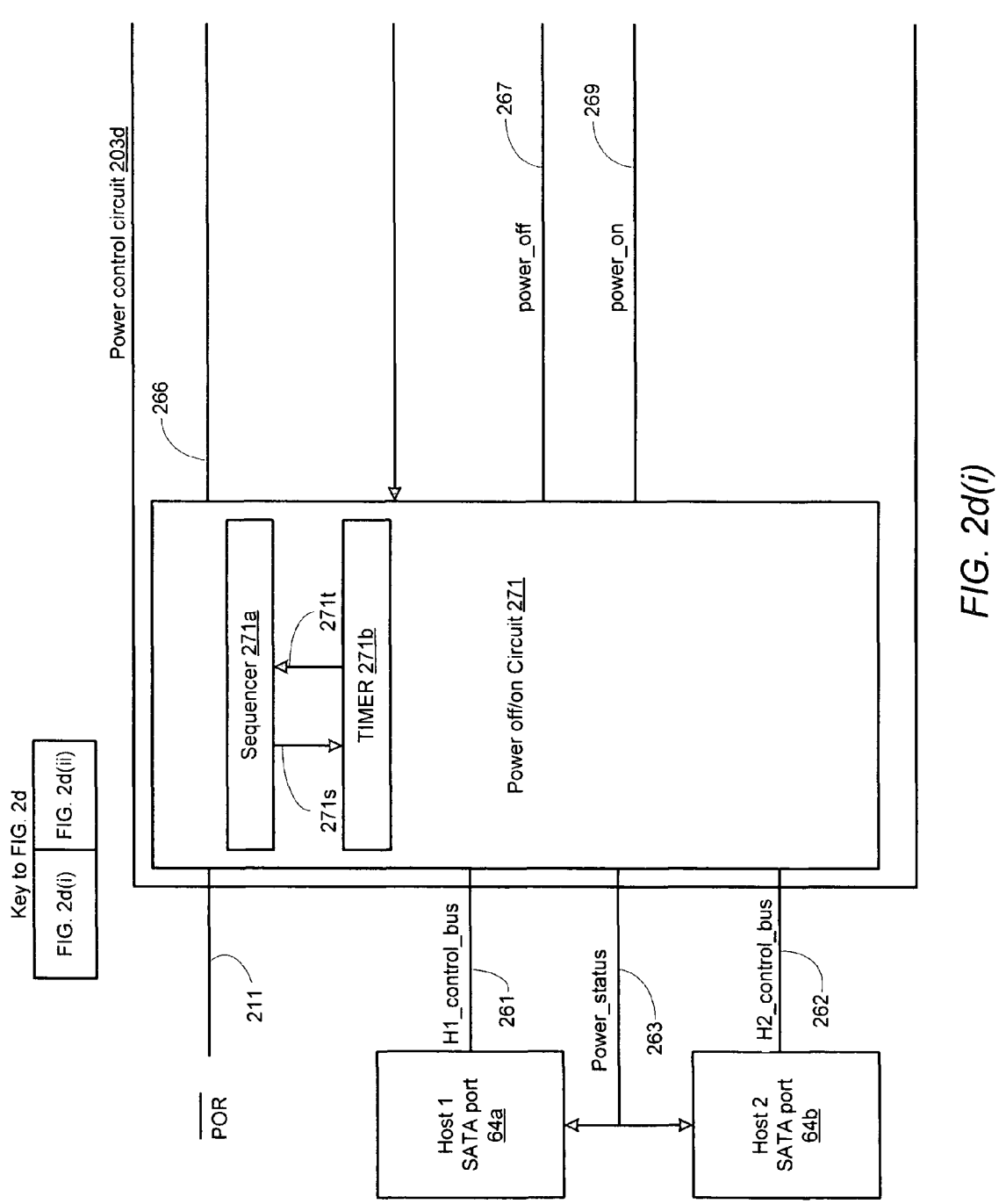
FIG. 2d shows a further details of an embodiment of present invention with atomic power cycle operation.

FIG. 2d shows further details of an embodiment of present invention with atomic power cycle operation. In FIG. 2d a power control circuit 203d is shown to be coupled to a SATA port 64a, a SATA port 64b and the power control circuit 202. The power control circuit 203d is shown to include a RS flip flop 270 and a power off/on circuit 271. The RS flip flop 270 generating a power control signal 206, the set signal 267 and rest signal 269 of RS flip flop 270 is coupled to the power off/on circuit 271. The RS flip flop 270 is held in reset condition when power on reset signal 211 is asserted (active low). The power control circuit 203d is shown to include a power off/on circuit 271 coupled to SATA port 64a via control bus 261 and power status 263, to SATA port 64b via control bus 262 and power status 263, and power control signal 206. The power off/on circuit 271 generates power off signals 267, and power on signals 269. The power off/on circuit 271 further includes a sequencer 271a and a timer 271b. The control bus 261 includes a power cycle request signal 261r indicating a request by the host 11 to initiate a power cycle. The control bus 262 includes a power cycle request signal 262r indicating a request by the host 12 to initiate a power cycle. The said power cycle request signals, 261r and 262r are generated by any method of present invention. In response to power cycle request signals 261r or 262r the sequencer 271a starts, first the sequencer 271a asserts power off signal 267 to cause power circuit 202 to turn power off, next the sequence 271a starts timer 271b by asserting timer start signal 271s, and waits for the timer 271b to time out, when timer 271b expires a time out signal 271t is generated and in response the sequencer 271a deasserts timer start signal 271s, deasserts power off 267 and assert power on signal 269 which will cause power circuit 202 to turn power on.

In general either hosts can initiate a power "off"/"on" cycle. Uncoordinated power "off"/"on" by host 11 and host 12 may lead to problems. For example during error recovery host 11 completes power "off"/"on" and then issues commands, and shortly after host 12 performing error recovery may initiate a power "off"/"on" cycle followed by issuing commands, the power "off"/"on" cycle by host 12 will cause command issued by host 11 to be aborted and host 11 may initiate another error recovery causing commands issued by host 12 to be aborted. This situation may lead to a condition that either host may incorrectly conclude that the drive is dead since power "off"/"on" cycle did not bring drive to an operational state. In practice either an in-band coordination via AAMux or out-of-band coordination via other communication paths between the hosts is required to perform power "off"/"on" cycle. An embodiment with in-band coordination via AAMux will be discussed later.

An improvement of embodiment of FIG. 2d to avoid coordination between hosts for power cycle follows next. The operation of power on/off circuit 271 in FIG. 2d, is modified to ignore a request by a host for atomic power cycle when an atomic power cycle is in progress or completed in response to an earlier power cycle request by the other host. The power cycle request will be ignored until the host issues a command after atomic power cycle request by the other host is completed.

Yet Another method to toggle power is to use a vendor unique command to turn power 'off' and 'on' (toggle). FIG. 8a shows an exemplary host to device register FIS data structure 501 in accordance with an embodiment of the present invention. The value of FIS type 510a for host to device register FIS 501 is 27$_h$ (the subscript h indicates the number is in hexadecimal). A host to device register FIS 501 with C-bit 510b set indicates command from host and is called a "command FIS". The commands includes vendor unique commands (VUC) that is not generally supported by all devices but unique for each vendor, and hence the name "vendor unique commands". The VUC is targeted at the device 66 and not the AAMux 64. The method of present invention uses a predefined setting for combination of other fields of a command FIS that does not occur in standard command FIS to send VUC specifically to the AAMux (AAMux VUC). Upon receipt of such AAMux VUC, the AAMux will not forward the command FIS to device 66 and will provide the response directly to host. The VUC command codes include $80_h$-$86_h$, $88_h$-$8F_h$, $C1_h$-$C3_h$, $F0_h$, $F7_h$, $FA_h$-$FF_h$. In particular the method of present invention uses the VUC code $FF_h$, along with a predefined setting of $FF_h$ for Dev/Head register 511d, along with value of $A_h$, for the upper nibble (bits 7-4) of control register 513d to indicate an AAMux VUC. It is obvious to one skilled in the art to devise other combinations of settings to specify a AAMux VUC. For a AAMux VUC the features register 510d includes sub-command codes that define the operation or service requested by the AAMux VUCs.

The contents of host to device register FIS for AAMux VUC are shown below:

|  | 7 | 6 | 5 | 4 | 3 | 2 | 1 | 0 |
|---|---|---|---|---|---|---|---|---|
| Command Register 510c |  |  |  | FFh |  |  |  |  |
| Sector Count 513a |  |  |  | VUC Specific |  |  |  |  |
| Sector Number 511a |  |  |  | VUC Specific |  |  |  |  |
| Cyl Low 511b |  |  |  | VUC Specific |  |  |  |  |
| Cyl High 511c |  |  |  | VUC Specific |  |  |  |  |
| Dev/Head 511d | 1 | 1 | 1 | 1 | 1 | 1 | 1 | 1 |
| Features 512d |  |  |  | AAMux VUC |  |  |  |  |
| Control 513d | 1 | 0 | 1 | 0 | na | SRST | na | na |

FIG. 8b shows an exemplary device to host register FIS data structure 502 in accordance with an embodiment of the present invention. The value of FIS type 520a for host to device register FIS 502 is 34h (hexadecimal). The device to host register FIS 502 is used to provide response to host including response for AAMux VUCs. In particular the status register 520c includes the status.

The contents of device to host register FIS 502 for response to AAMux VUC are shown below:

|  | 7 | 6 | 5 | 4 | 3 | 2 | 1 | 0 |
|---|---|---|---|---|---|---|---|---|
| Status Register | BSY | PWR | NA | NA | DRQ | NA | NA | ERR |
| Error Register |  |  |  |  |  |  |  |  |
| Sector Count 513a |  |  |  | VUC Specific |  |  |  |  |
| Sector Number 511a |  |  |  | VUC Specific |  |  |  |  |
| Cyl Low 511b |  |  |  | VUC Specific |  |  |  |  |
| Cyl High 511c |  |  |  | VUC Specific |  |  |  |  |
| Dev/Head 511d | 1 | 1 | 1 | 1 | 1 | 1 | 1 | 1 |

Communication between hosts via a mailbox is well known in the art and will not be discussed here. In the embodiment of FIG. 1, SATA port 64a is shown to include mailbox A 61a, and SATA port 64b is shown to include mailbox B 61b. In this embodiment the mailbox A 61a and mailbox B 61b comprise of four general purpose registers. The unique aspect of present invention is providing access to mailboxes via AAMux. Host 11 and host 12 can write to mailbox A and mailbox B registers via AAMux VUC 01h. Host 11 or host 12 can read mailbox A or mailbox via AAMux VUC 03h and 04h. The 4-byte mail box contents is returned via device to host register FIS in Sector Count 513a, Sector Number 511a, Cyl Low 511b, Cyl High 511c respectively. It should be noted that host 11 or host 12 can read individual registers of mailbox A or mailbox via AAMux VUC 0.

Communication path between the hosts via mailbox and AAMux VUC to access the mailboxes provides an in-band coordination between host 11 and host 12.

By way of vendor unique commands a variety of operations can be performed by the AAMux. Such operations include the following:

| AAMux VUC code | description |
|---|---|
| 00h | NOP.<br>In response to NOP, the AAMux 64 will send device to host register FIS 502. NOP provides a way to obtain status without requesting any operation |
| 01h | Write AAMux internal register.<br>Register Address is in "Sector Count" 513a<br>Data is in ""Cyl Low" 511b<br>Data Mask is in "Cyl High" 511c. Data Mask specifies register bits that should be written (and bits that are not affected) |
| 02h | Read AAMux internal register<br>Register Address is in "Sector Count" 513a.<br>Contents of register is returned in ""Cyl Low" 511b via device to host register FIS 502 |
| 03h | Read internal mailbox A 61a |
| 04h | Read internal mailbox B 61b |
| 05h | Power OFF |
| 06h | Power ON |
| 07h | Atomic Power Cycle<br>The timer 271b timeout value is programmable. Cyl high 511c is concatenated with Cyl low 511b to form a 16-bit timeout value for timer 271b. |
| 08h | Change timeout value of timer<br>The timer 271b timeout value is set to 16-bit value formed by concatenating Cyl high 511c and Cyl low 511b |
| 09h~FFh | Reserved |

Next, another embodiment of the present invention is shown in relation to the use of Just a Bunch of Disks (JBOD), which as previously explained, is basically a disk array or array of HDDs.

The SATA and SAS use the same connector, to allow use of either a SATA or SAS device in the same system. The SATA will use only one link of the connector whereas the SAS will use both links on the connector. A specific example is in the context or application of what is commonly known as "Just a Bunch of Disks" (JBOD), or Disk Arrays which is essentially a large number of removable HDDs that are in the same enclosure, connected to a backplane and coupled to a common system interface. In JBODs using SATA or SAS HDDs it is desirable to use either SATA or SAS HDDs interchangeably. Such JBODs will be referred to as SAS/SATA JBODs. Yet another problem associated with the use of SATA switches on the backplane of SAS/SATA JBOD is the need to bypass the switch on the backplane when a SAS HDD is used.

Currently, a JBOD requiring SATA coupling as well as SAS coupling needs two different connections therefor, one for the SATA coupling and another for the SAS coupling. Specifically, SATA uses one link of a connector, whereas, SAS uses both links of a connector and SATA requires a switch, whereas, SAS does not.

Figure 3:
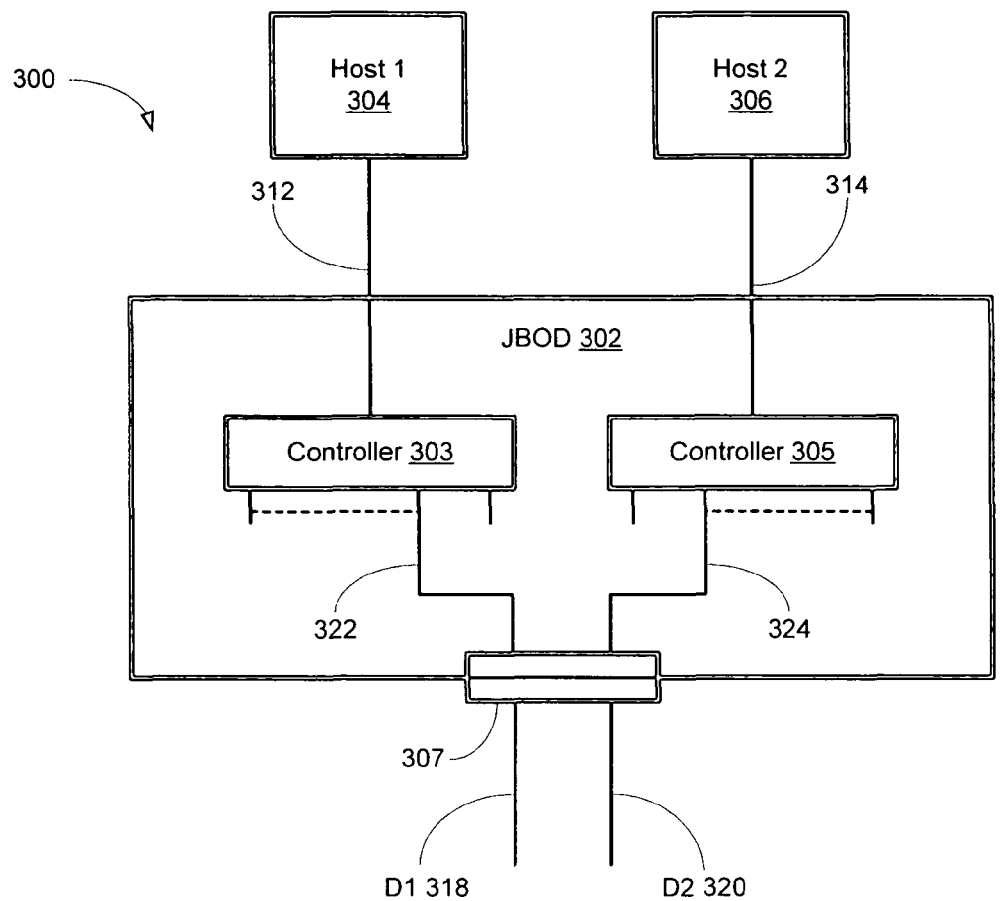
FIG. 3 shows a JBOD system 300 in accordance with an embodiment of the present invention.

In accordance with an embodiment of the present invention, FIG. 3 shows a JBOD system 300 to include a JBOD 302, a one or more connection circuit 307 coupled thereto or physically residing therein, a host 304 coupled to the JBOD 302, through the link 312, a host 306, coupled to the JBOD 302, through the link 314, a host controller 303 coupled to link 312 and generating one or more links 322 for connection to HDDs and host controller 305 coupled to link 314 and generating one or more links 324 for connection to HDDs. The connection circuit 307 is shown to generate a D1 output 318 and a D2 output 320 in response to inputs 322 and 324. While prior art techniques use two connectors to couple the links 322 and 324 to the outputs 318 and 320, respectively, as shown in FIG. 3, an embodiment of the present invention uses only one connector, which is included in the connection circuit 307 and shown in greater detail in other figures to be discussed shortly.

Perhaps, at this time, a brief discussion for the purpose of using two connectors by prior art systems is in order. The need for the use of two different connectors arises, in large part, due the use of SATA as well as SAS HDDs. To this end, SATA uses one link of a connector, whereas, SAS uses two links of a connector, accordingly, SATA requires the use of a switch, whereas, SAS does not. Thus, the embodiment of the present invention, shown in FIGS. 3-5 employs a combination of switch and connector within the connection circuit 307 to alleviate the need for two connectors, yet, operate with SATA and SAS HDDs.

Figure 4:
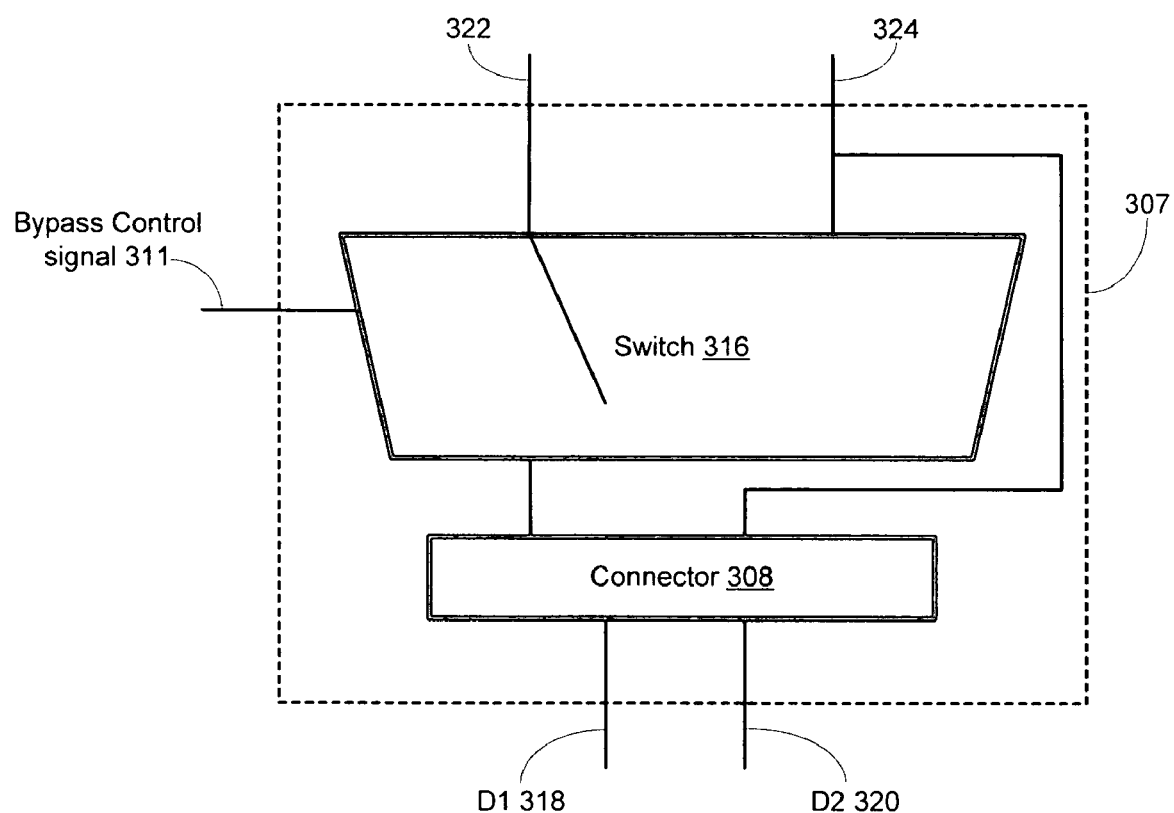
FIG. 4 shows further details of the connection circuit 307 in accordance with an embodiment of the present invention.

Referring now to FIG. 4, further details of the connection circuit 307 are shown to include a switch 316 responsive to the links 322 and 324 and a connector 308 coupled to receive the mux output 313 and the link 314 and to generate the D1 output 318 and the D2 output 320.

The switch 316 is also shown to receive a bypass control signal 311, which is essentially indicative of a SAS HDD where the switching function of switch 316 is bypassed and the links 322 is coupled to output link 313, and links 313 and 324 ultimately generating the D1 output 318 and the D2 output 320, respectively. This is further clear with respect to FIG. 5 where a functional representation of the relationship between the links 322 and 324 and the D1 output 318 and the D2 output 320, respectively, is shown.

In FIG. 5, a functional relationship, as that described above is shown. That is, when the bypass control signal 311 indicates a SAS HDD, the link 322 essentially generates the D1 output and the link 324 essentially generates the D2 output 320. However, when the bypass control signal 311 indicates a SATA HDD, the links 322 and 324 are selectively caused to generate the D1 output 318, i.e. the links 312 and 314 are each inputs of the switch 316 and are then multiplexed to generate the D1 output 318, and the D2 output 320 remains unused. In this manner, only one connector is utilized to accommodate both SATA and SAS HDDs.

In yet another embodiment of the switch shown in FIG. 6a, the switch 336 has an additional device port, that is the switch 336 has a first host port 331, a second host port 332, a first device port 341, a second device port 342, and a bypass control signal 311. When the bypass control signal 311 indicates a bypass mode (used with SAS HDD) the first host port 331 is coupled to first device port 341 and the second host port 332 is coupled to second device port 342. When the bypass control signal 311 indicates a non-bypass mode (used with SATA HDD), the second device port 342 is disabled and the switch operates in normal mode wherein the first host port 331 and second host port 332 are multiplexed on the first device port 341.

Referring now to FIG. 6b, further details of the connection circuit 307 are shown to include a switch 336 responsive to the links 322 and 324 and a connector 308 coupled to receive the outputs 341 and 342 of switch 336 and to generate the D1 output 318 and the D2 output 320."

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention. It is obvious to an expert in the art to combine the present invention with prior art to develop devices and methods that perform multiple functions including the teachings of this invention. Such devices and methods fall within the scope of present invention.

What is claimed is:

1. A switch employed in a system having two hosts in communication with a hard disk drive through the switch and for coupling two or more host ports of the hosts to the hard disk drive comprising:

A power control circuit generating a power signal for use by the hard disk drive in receiving power for operability thereto, the power control circuit being responsive to detection of inoperability of the hard disk drive and in response thereto, toggling the power signal to the hard disk drive while avoiding interruption to the system, during the toggling of the power signal, the switch operative to use a sequence of COMRESET bursts to turn power "off" and another sequence of COMMREST bursts to turn power "on", the sequence and another sequence not occurring during operation of the of the hard disk drive, the sequence and another sequence using two back to back port select out of band (PS OOB) sequences with two delays between the two PS OOB, wherein if the delay is between a first range then the sequence is designated to turn "off" power and if the delay is between a second range the sequence is designated to turn power "on".

2. A switch, as recited in claim 1, further including an out of band (OOB) detector coupled to the power control circuit for generating an OOB sequence to toggle power to the hard disk drive.

3. A switch, as recited in claim 1, further including a power circuit coupled to the power control circuit for generating a power control signal for toggling power to the HDD.

4. A switch, as recited in claim 3, wherein the power generator circuit includes a T type flip flop coupled to an gating circuit responsive to an enable signal wherein the T type flip flop causes toggling of the power to the hard disk drive when the enable signal is active.

5. A system having two hosts in communication with a hard disk drive (HDD) comprising:

A switch coupling the two hosts to the HDD including,
a power control circuit generating a power signal for use by the HDD in receiving power for operability thereto, the power control circuit responsive to detection of inoperability of the HDD and in response thereto, toggling the power signal to the HDD while avoiding interruption to the system, wherein during the toggling of the power signal, the switch operative to use a sequence of COMRESET bursts to turn power "off" and another sequence of COMMREST bursts to turn power "on", the sequence and another sequence not occurring during operation of the of the hard disk drive, the sequence and another sequence using two back to back port select out of band (PS OOB) sequences with two delays between the two PS OOB, wherein if the delay is between a first range then the sequence is designated to turn "off" power and if the delay is between a second range the sequence is designated to turn power "on".

6. A system, as recited in claim 5, wherein the two hosts are each coupled to the switch through a Switching Serial Advanced Technology Attachment (SATA) host port.

7. A system, as recited in claim 5, further including an OOB detector coupled to the power control circuit for generating an OOB sequence to toggle power to the HDD.

8. A system, as recited in claim 5, further including a power circuit coupled to the power control circuit for generating a power control signal for toggling power to the HDD.

9. A system, as recited in claim 8, wherein the power generator circuit includes a T type flip flop coupled to a gating circuit responsive to an enable signal wherein the T type flip flop causes toggling of the power to the HDD when the enable signal is active.

10. A system, as recited in claim 9, wherein the gating circuit is an AND gate.

11. A system, as recited in claim 5, wherein the switch is a fiber channel switch.

12. A system, as recited in claim 5, wherein the switch is a Switching Serial Advanced Technology Attachment (SATA) switch.

13. A system, as recited in claim 5, wherein the switch is a Advanced Technology Attachment (ATA) switch.

14. A switch, as recited in claim 3, wherein the power control signal is communicated to the HDD through a Switching Serial Advanced Technology Attachment (SATA) link.

15. A switch, as recited in claim 1, wherein the power control circuit includes a T type flip flop, coupled to receive a host port select signal and a host port select signal and operative to generate the power signal, the T flip flop 240 being held in reset condition when a power on reset signal is asserted or when an active active mode select signal is deasserted, wherein upon detection of a PS OOB, the corresponding host port select signal is asserted causing the state of power control circuit to toggle, further wherein when an active active mode select is asserted, switch is configured for AAMux operation, otherwise, the switch is configured for APMux operation.

* * * * *